United States Patent [19]
Levy et al.

[11] Patent Number: 6,167,490
[45] Date of Patent: *Dec. 26, 2000

[54] USING GLOBAL MEMORY INFORMATION TO MANAGE MEMORY IN A COMPUTER NETWORK

[75] Inventors: Henry M. Levy, Seattle, Wash.; Michael J. Feeley, Vancouver, Canada; Anna R. Karlin; William E. Morgan, both of Seattle, Wash.; Chandramohan A. Thekkath, Palo Alto, Calif.

[73] Assignees: University of Washington, Seattle, Wash.; Digital Equipment Corporation, Maynard, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/928,278

[22] Filed: Sep. 12, 1997

Related U.S. Application Data

[60] Provisional application No. 60/026,976, Sep. 20, 1996.

[51] Int. Cl.$^7$ ........................................ G06F 13/00
[52] U.S. Cl. .................. 711/148; 711/120; 711/130; 711/147; 711/170
[58] Field of Search ..................... 711/152, 135, 711/136–149, 120, 130, 170; 395/675, 800.11

[56] References Cited

U.S. PATENT DOCUMENTS

| | | | |
|---|---|---|---|
| 5,117,350 | 5/1992 | Parrish et al. ........................... | 711/1 |
| 5,590,308 | 12/1996 | Shih ......................................... | 711/136 |
| 5,701,482 | 12/1997 | Harrison et al. ......................... | 395/675 |
| 5,710,935 | 1/1998 | Barker et al. ............................. | 711/149 |
| 5,842,031 | 11/1998 | Barker et al. ....................... | 395/800.11 |
| 5,893,149 | 4/1999 | Hagersten et al. ....................... | 711/135 |
| 5,893,160 | 4/1999 | Loewenstein et al. .................. | 711/152 |

*Primary Examiner*—John W. Cabeca
*Assistant Examiner*—Fred F. Tzeng
*Attorney, Agent, or Firm*—Ronald M. Anderson

[57] ABSTRACT

A system and method for managing memory in a network. In a computer network in which multiple computers (nodes) are interconnected by a network, the primary memory on one node may be used to store memory data (pages) from other nodes. The transfer of a data page over the network from the memory of a node holding it to the memory of another node requesting that data gives improved performance when compared to the transfer of the same data from disk, either local or remote, to the requesting node. Global information about the disposition of the nodes and their memories in the network is used to determine the nodes in the network that should best be used to hold data pages for other nodes at a particular time. This information is exchanged by the nodes periodically under command of a coordinating node. The system includes distributed data structures that permit one node to locate data pages stored in another node's memory, procedures to determine when global information should be recomputed and redistributed, and procedures to avoid overburdening nodes with remote page traffic.

26 Claims, 12 Drawing Sheets

USING GLOBAL MEMORY INFORMATION TO MANAGE MEMORY IN A COMPUTER NETWORK

RELATED APPLICATION

This application is a continuation-in-part patent application, based on prior copending provisional application Ser. No. 60/026,976, filed Sep. 20, 1996, the benefit of the filing date of which is hereby claimed under 35 U.S.C. § 119(e).

GOVERNMENT RIGHTS

This invention was made with U.S. government support under Contract Nos. CDA-9123308, CCR-9200832, and GER-9450075 granted by the National Science Foundation. The government has certain rights in the invention.

FIELD OF THE INVENTION

The present invention relates generally to a distributed computer system, and more particularly, to a distributed computer system in which the primary memory of a computer node is used to store data from other nodes as well as its own.

BACKGROUND OF THE INVENTION

Distributed computer systems typically comprise multiple computers connected to each other by a communication network. Prior art has shown that in a distributed computer system, primary memory on one computer can be used as temporary storage, in place of a disk, for pages displaced from the memory of a different computer. The pages stored in this way may later be fetched from computers storing them, rather than from a disk.

A significant problem in the system described above is how to choose the computers in which to store the data from other computers. Prior art has demonstrated several schemes to choose the computers to store the data. These schemes fall into two categories identified by the terms "Fixed Set" and "Variable Set."

Fixed Set

In this scheme, a fixed set of computers (memory servers), typically with large memories, store data on behalf of other computers in the network. A computer wishing to store data sends data to a member of this fixed set by executing a procedure to select the specific member of the set.

Variable Set

In this scheme, the set of computers that store data for the other computers varies and could include all the computers in the network. As with the fixed set scheme, when a particular computer wishes to store its data on another computer, the system uses a procedure to pick a target computer from this set. Prior art uses several procedures to pick a target node. These procedures all use only local information to make the choice of target node; that is, the information used by the procedure does not account for the disposition or current state of other computers in the network.

The procedures in both classes have several shortcomings. The fixed set procedures suffer from three problems. First, the fixed set procedures rely on a small number of specific servers, which may require unusually large physical memories to be effective. Those servers may become overloaded under heavy use, particularly from a large number of clients accessing them simultaneously. Or, the purchase of additional server nodes may be required if the load increases or more client nodes are added to the network. Second, the server nodes are unavailable for running normal applications, because of their dedicated nature and the workload always placed on them. Third, such systems are unable to benefit from the global collection of physical memories available on all of the client nodes in the system. The potential of benefiting from this client memory is increased as average memory size per node increases.

The variable set procedures can benefit from the global collection of memories on all of the nodes; however, because they are limited to local information only, they may choose a poor target on which to store pages, giving rise to two problems. First, the sending of a page to a poorly chosen target node (e.g., one that is busy) may harm the performance of that target node. Second, the sending of a page to a poorly selected target node is unlikely to result in that page being found later when needed by the sender, because the busy node will have discarded the page. Consequently, the requesting node may eventually require a disk access.

In summary, previous distributed memory systems have been limited by their reliance on either dedicated servers or on local information, and have therefore been unable to maximize the benefit of all of the memory on all of the computers in the network. They have not employed specific procedures and mechanisms permitting completely distributed management of the memory so as to enable nodes to choose the best targets for storing pages. It would clearly be preferable to enable sharing of all of the memory on all of the connected computer systems for the combined good of the system. This approach would solve specific problems and limitations of those previous systems and permit global performance optimization.

SUMMARY OF THE INVENTION

The present invention employs software to utilize the memory of preferably all computers on a network without requiring that dedicated computers with large memories be allocated for this purpose. The procedure uses global information, i.e., each node has available information that takes into account the disposition of other computers in the network. This information permits a computer wishing to store data outside its own memory to select another computer to receive that data, in such a way as to optimize use of all of the memory in the network. All computers on the network periodically send data packets describing the values (i.e., ages) of all of their primary memory pages. A coordinating node processes these packets, producing information that sequences the values of pages network-wide. This information is then redistributed to all computers, where it is used by the local memory management systems to choose target nodes to which to send displaced data pages. The system includes automated means for deciding when to recompute the values of pages, and distributed data structures that are used to locate pages in the network. It also includes a procedure using randomness that prevents the overloading of computers from remote page sends, while still meeting the goal of optimizing memory in the network.

A coordinator node asks all other nodes for some information, processes that information, and then redistributes it. Alternatively, the nodes exchange information directly with each other, either periodically or whenever they communicate with other nodes. As a further alternative, randomly or partially randomly selected nodes exchange information to enable global memory management.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

1. Introduction

Figure 1:
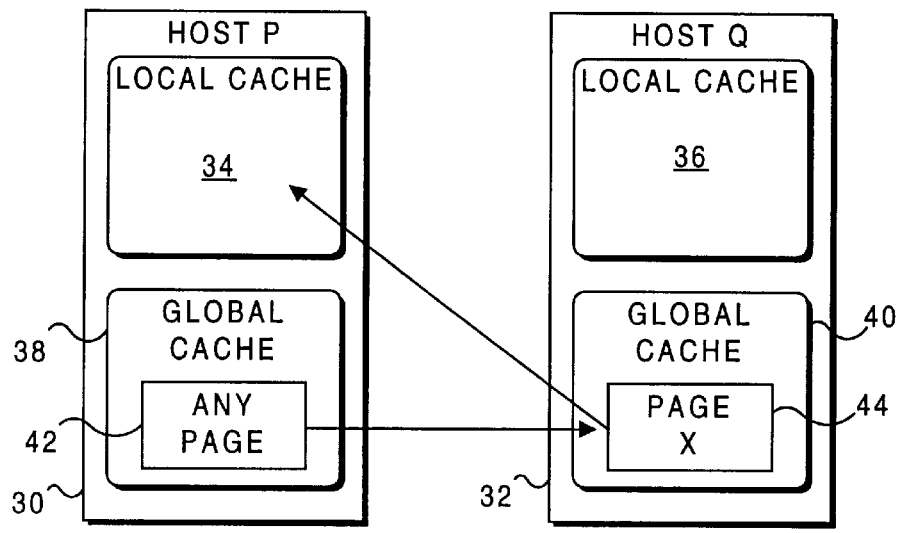
FIG. 1 is a schematic diagram illustrating global replacement with hit in the global cache.

The following is a description of a global memory management system implemented in a workstation cluster in accord with a preferred embodiment of the present invention. This embodiment uses a single, unified but distributed, memory management algorithm running at the lowest level of an operating system used by the workstation cluster. By managing memory globally at this level, all system and higher level software, including virtual memory (VM), file systems, transaction systems, and user applications benefit from all available memory on the workstation cluster. The algorithm in this embodiment is implemented in the Digital Equipment Corporation (DEC) OSF/1 operating system running on an ATM-connected cluster of DEC ALPHA workstations. Measurements have shown that on a suite of memory intensive programs, the present invention improves performance by a factor in the range from 1.5 to 3.5. In addition, the present invention has been shown to have a performance advantage over prior art systems.

As used in connection with this preferred embodiment, the term "cluster" means a high speed local area network (LAN) with a plurality of high performance computers operating within a single administrative domain. The premise of the present invention is that a single, unified, memory management algorithm can be used at a low level of the operating system to manage memory cluster-wide. In contrast, in a conventional cluster of computers coupled in a network, the operating system acts as an autonomous agent, exporting services to other nodes, but not acting in a coordinated way. Such autonomy has advantages, but results in an underutilization of resources that could be used to improve performance. For example, global memory management allows the operating system to use cluster-wide memory to avoid many disk accesses; this task becomes more important with the widely growing disparity between processor speed and disk speed. It is believed that as processor performance increases and communication latency decreases, workstation or personal computer clusters should be managed more as a multi-computer than as a collection of independent computers.

By inserting a global memory management algorithm at the lowest OS level, the invention integrates, in a natural way, all cluster memory for use by all higher level functions, including VM paging, mapped files, and file system buffering. The invention can automatically reconfigure to allow computers in the domain to join and in most cases, to depart the cluster at any time. In particular, using the algorithm and implementation of the present invention, no globally managed data are lost when a cluster node crashes.

This preferred embodiment of the invention, which is referred to as Global Memory Service (GMS) has been used to conduct experiments on clusters of up to 20 computers using a suite of real world application programs. The results show that the basic costs for global memory system management operations are modest and that application performance: improvement can be significant. For example, the experiments show a 1.5 to 3.5 fold speedup for a collection of memory intensive applications running with GMS; these speedups are close to optimal for these applications, given the relative speeds of remote memory and disk.

2. Comparison With Prior Art

Several previous studies have examined various ways of using remote memory. In one paper that describes remote paging in the context of the Apollo DOMAIN System, each computer in the network has a paging server that accepts paging requests from remote nodes. This system allows local users to statically restrict the amount of physical memory available to the paging server.

Another prior art system employs a remote memory model in which a cluster contains workstations, disk servers, and remote memory servers. The remote memory servers are dedicated computers whose large primary memories can be allocated by workstations with heavy paging activity. No client-to-client resource sharing occurs, except through the servers. This idea has also been generalized to use memory on idle client computers as paging backup storage for memory pages. When a computer becomes idle, its kernel (part of the operating system running on the computer) activates an otherwise dormant memory server, which registers itself for remote use. Whenever the kernel replaces a VM page, it queries a central registry to locate active memory servers, picking one at random to receive the replacement victim. A simple queuing model has been used to predict performance.

In a different environment, remote paging has been used to enhance the performance of mobile computers. The goal of this prior art approach is to permit small memory starved portable computers to page to the memories of larger servers nearby; pages could migrate from server to server as the portables migrate.

Remote memory has also been used in a client server database management system (DBMS). This system assumes a centralized database server that contains the disks for stable storage plus a large memory cache. Clients interact with each other via a central server. On a page read request, if the page is not cached in the server's memory, the server checks whether another client has that page cached; if so, the server asks that client to forward its copy to the workstation requesting the read. Several variants of this algorithm have been evaluated using a synthetic database workload.

Algorithms for utilizing remote memory have previously been evaluated in the art, the best of which is called N-chance forwarding. Using N-chance forwarding, when a node is about to replace a memory page, it checks whether that page is the last copy in the cluster (a "singlet"); if so, the node forwards that page to a randomly picked node, otherwise it discards the page. Each page sent to remote memory has a circulation count, N, and the page is discarded after it has been forwarded to N nodes. When a node receives a remote page, that page is made the youngest on its least recently used (LRU) list, possibly displacing another page on that node; if possible, a duplicate page or recirculating page is chosen for replacement. Algorithms of this type have been evaluated using a simulator running one two-day trace of a Sprite workload; the previous analysis examined file system data pages only (i.e., no VM paging activity and no program executables).

The present invention is related to these previous studies, but also differs in significant ways. First, it is integrated with the lowest level of the operating system and encompasses all memory activity, including VM paging, mapped files, and explicit file access. Second, in the prior art memory management systems, even where client-to-client sharing occurs, each node acts as an autonomous agent. In contrast, in the present invention, memory is managed globally, and an attempt is made to make good choices both for the faulting node and the cluster as a whole. The "faulting node" refers to the computer that is attempting to access a memory page that is not present in its own memory. (A more detailed comparison of the global vs. autonomous scheme is provided below.) Third, the present invention can gracefully handle addition and deletion of nodes in the cluster without user intervention. Finally, the preferred embodiment described below is well integrated into a production operating system, such as DEC's OSF/1.

3. Memory Management Algorithm Employed by GMS

This section describes the basic algorithm used by GMS. The description is divided into two parts. First, a high level description of the global replacement algorithm is provided. Second, the probabilistic process by which page information is maintained and exchanged in the cluster is described.

3.1 Description of the Algorithm

As previously stated, this algorithm globally coordinates memory management. It is assumed that nodes "trust" each other but may crash at any time. All nodes run the same algorithm and attempt to make choices that are good in a global cluster sense, as well as good for the local node. Pages on a node P are classified as being either local pages, which have been recently accessed on P or global pages, which are stored in P's memory on behalf of other nodes. Pages may also be private or shared; shared pages occur because two or more nodes might access a common file exported by a file server. Thus, a shared page may be found in the active local memories of multiple nodes; however, a page in global memory is always private.

In general, the algorithm changes the local/global memory balance as the result of faults caused by an access to a nonresident page, i.e., by an attempt to access a page that is not present in the memory of the computer attempting the access. Node P, on a fault, performs the following global replacement algorithm, described in terms of four possible cases:

Case 1: A faulted page X (reference numeral 44), which is required by a node P, i.e., a workstation 30, is in the global memory of another node Q, i.e., a workstation 32, as depicted in FIG. 1. The desired page in Q's global memory is swapped with any global page 42 in P's global memory 38. Once brought into P's local memory 34, the faulted page becomes a local page, increasing the size of P's local memory by one page. Q's local memory 36/global memory 40 balance is unchanged.

Case 2: The faulted page is in the global memory of node Q, but P's memory contains only local pages. In this case, the LRU local page on P is exchanged with the faulted page on Q. The size of the global memory on Q and the local memory on P are unchanged.

Figure 2:
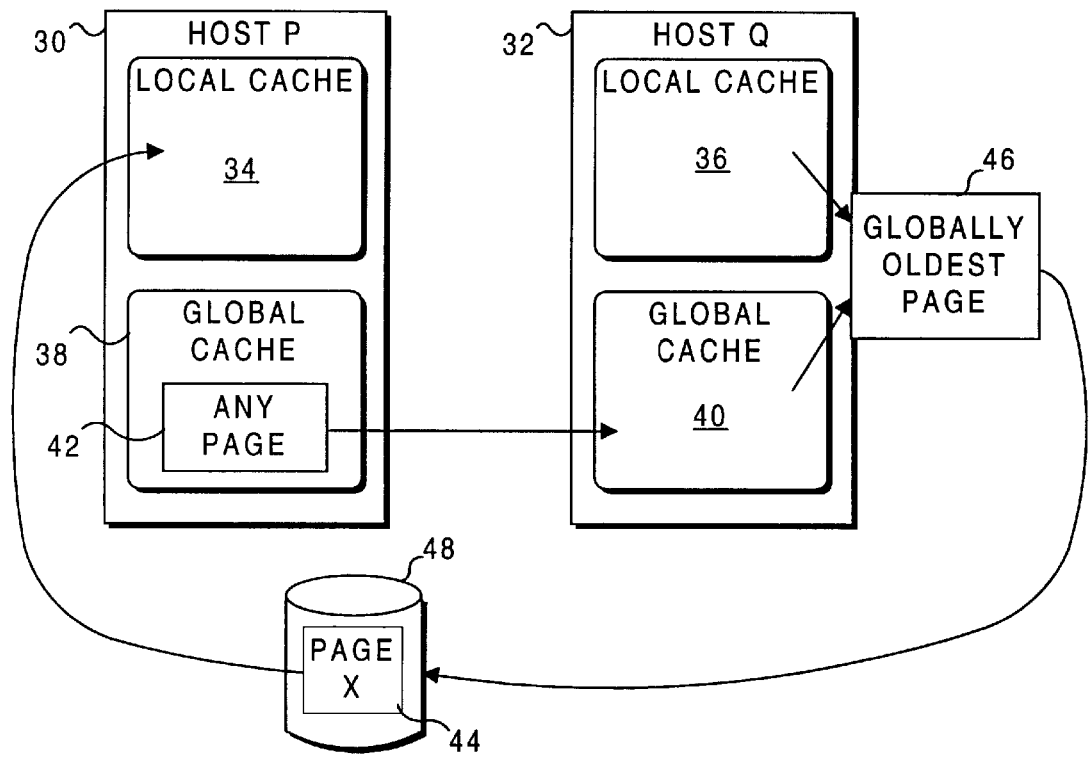
FIG. 2 is a schematic diagram illustrating global replacement and showing miss in the global cache.

Case 3: The faulted page is on disk (local or remote). For this case, the faulted page is read into node P's memory, where it becomes a local page. An oldest page 46 in the cluster (e.g., on node Q) is chosen for replacement and written to a disk drive 48, if necessary. Any global page 42 on node P is sent to node Q, where it continues as a global page. If P has no global pages, P's LRU local page is chosen instead. This process is shown in FIG. 2.

Case 4: The faulted page is a shared page in the local memory of another node Q. That page is copied into a frame on node P, leaving the original in local memory on Q. The oldest page in the cluster (say, on node R) is chosen for replacement and written to disk if necessary. A global page on node P is sent to node R where it becomes a global page. (If P has no global pages, P's LRU local page is chosen instead.)

The behavior of this algorithm is fairly straightforward. Over time, nodes that are actively computing and using memory will fill their memories with local pages and will begin using remote memory in the cluster; nodes that have been idle for some time and whose pages are old will begin to fill their memories with global pages. The balance between local and global storage on a node is thus dynamic and depends on its workload and the workload in the cluster. The basic issue is when to change the amount of global storage and local storage, both on a node and in the cluster overall. In general, on a fault requiring a disk read, the (active) faulting node increases its local memory, while the cluster node with the oldest page (an "idle" node) loses a page to disk. Global memory grows when the faulting node has no global pages and the oldest page in the network is a local page (i.e., the oldest local page on the faulting node becomes a global page, replacing the oldest cluster page.)

Ultimately, the goal of this algorithm and of the present invention is to minimize the total cost of all memory references within the cluster. The cost of a memory reference depends on the state of the referenced page: in local memory, in global memory on another node, or on disk. A local memory access is over three orders of magnitude faster than a global memory or disk access, while a global memory access is only two to ten times faster than a disk access. Therefore, in making replacement decisions, the algorithm may want to replace a global page before a local page of the same age, because the cost of mistakenly replacing a local page is substantially higher. Which decision is better depends on future behavior. To predict future behavior, a cost function is associated with each page. This cost function is related to the LRU, but is based on both the age of the page and its state. This preferred embodiment boosts the ages of global pages to favor their replacement over local pages of approximately the same age.

3.2 Managing Global Age Information

When a faulted page is read from disk (Cases 3 and 4), the algorithm discards the oldest page in the cluster. As described so far, it is assumed that full global information about the state of nodes and their pages is available in order to locate this oldest page. However, it is obviously impossible to maintain complete global age information at every instant; therefore, a variant is used in which each node has only approximate information about global pages. The objective of the algorithm is then to provide a reasonable tradeoff between the accuracy of information that is available to nodes and the efficiency of distributing that information. The key issue is guaranteeing the validity of the age information and deciding when it must be updated.

The algorithm divides time into epochs. Each epoch has a maximum duration, T, and a maximum number of cluster replacements, M, that will be allowed in that epoch. The values of T and M vary from epoch to epoch, depending on the state of global memory and the workload. A new epoch is triggered when either (1) the duration of the epoch, T, has elapsed, (2) M global pages have been replaced, or (3) the age information is detected to be inaccurate. Currently, each epoch is on the order of five to ten seconds.

This preferred embodiment of the present invention maintains age information on every node for both local and global pages. At the start of each epoch, every node sends a summary of the ages of its local and global pages to a designated initiator node. Using this information, the initiator computes a weight, w, for each node i, such that out of the M oldest pages in the network, $w_i$, reside in node i's memory at the beginning of the epoch. The initiator also determines the minimum age, MinAge, that will be replaced from the cluster (i.e., sent to disk or discarded) in the new epoch. The initiator sends the weights $w_i$ and the value MinAge to all nodes in the cluster. In addition, the initiator selects the node with the most idle pages (the list w) to be the initiator for the following epoch.

During an epoch, when a node P must evict a page from its memory to fault in a page from disk (Cases 3 and 4), it first checks if the age of the evicted page is older than MinAge. If so, it simply discards the page (since this page is expected to be discarded sometime during this epoch). If not, P sends the page to node i, where the probability of choosing node i is proportional to $w_i$. In this case, the page discarded from P becomes a global page on node i, and the oldest page on i is discarded.

The algorithm is probabilistic: on average, during an epoch, the ith node receives $w_i/M$ of the evictions in that epoch, replacing its oldest page for each one. This process yields two useful properties. First, the algorithm approximates LRU in the sense that if M pages are discarded by global replacement during the epoch, they are the globally oldest M pages in the cluster. Second, it yields a simple way to determine statistically when M pages have been replaced; i.e., when the node with the largest $w_i$ receives $w_i$ pages, it declares an end to the epoch.

To reduce the divergence from strict LRU, it is thus important to keep the duration of the epoch T and the value of M appropriate for the current behavior of the system. The decision procedure for choosing these values considers: (1) the distribution of global page ages, (2) the expected rate at which pages will be discarded from the cluster, and (3) the rate at which the distributed age information is expected to become inaccurate. (The age distribution on a node changes when its global pages are consumed due to an increase in its local cache size.) The latter two rates are estimated from their values in preceding epochs. Roughly speaking, the more old pages there are in the network, the longer T should be (and the larger M and MinAge are); similarly, if the expected discard rate is low, T can be larger as well. When the number of old pages in the network is too small, indicating that all nodes are actively using their memory, MinAge is set to 0, so that pages are always discarded or written to disk rather than forwarded.

3.3 Node Failures and Coherency

Node failures in the cluster do not cause data loss in global memory, because all pages sent to global memory are clean; i.e., a dirty page moves from local to global memory only when it is being written to disk. This embodiment does not change the number of disk writes that occur; it allows a disk write to complete as usual but promotes that page into the global cache so that a subsequent fetch does not require a disk read. If a node housing a requested remote page is down, the requesting node simply fetches the data from disk.

Likewise, since the algorithm deals with only clean pages, coherence semantics for shared pages are the responsibility of the higher level software that creates sharing in the first place. For instance, shared pages occur when nodes access a common NFS file, such as an executable file. Thus, the coherence semantics seen by users of the system are no stronger and no weaker than what NFS provides without the present invention.

3.4 Discussion

The goal of any global memory management system should be to utilize network-wide memory resources in order to minimize the total cost of all memory references. At the same time, it should avoid impacting programs not using global memory. To meet these goals, it is believed that the memory management algorithm of the present invention must use global, rather than local, knowledge to choose among the various possible states that a page might assume: local, global, or disk. This knowledge must be efficient to maintain, distribute, and evaluate. In practice, the algorithm must operate without complete information, and must be able to determine when information is out of date.

The algorithm is intended to meet these needs by using periodically distributed cluster-wide page age information in order to: (1) choose those nodes most likely to have idle memory to house global pages, (2) avoid burdening nodes that are actively using their memory, (3) ultimately maintain in cluster-wide primary memory the pages most likely to be globally reused, and (4) maintain those pages in the right places.

4. Implementation

The OSF/1 operating system on the DEC Alpha platform is modified to incorporate the algorithm described above. This section presents the details of that implementation.

Figure 3:
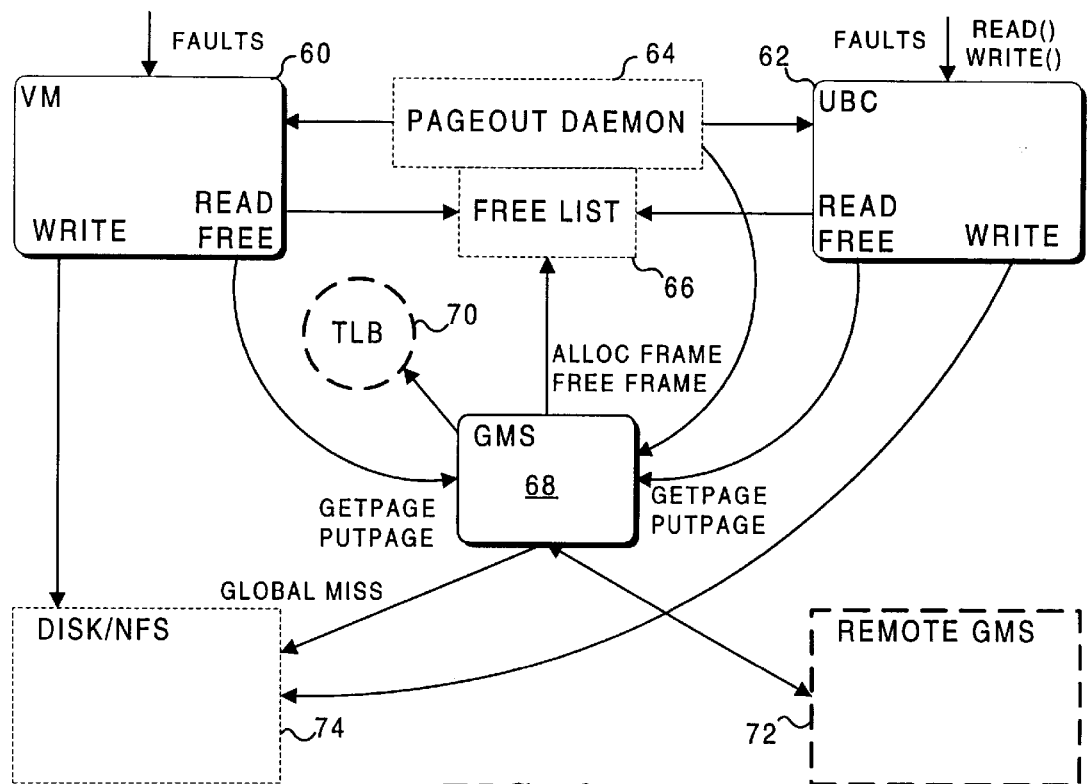
FIG. 3 is a schematic diagram illustrating a Structure of Modified OSF/1 Memory Management System.

FIG. 3 shows a simplified representation of the modified OSF/1 memory management subsystem. Functional components are represented by boxes, and arrows show some of the control relationships between these components. The two key components of the basic OSF/1 memory system are (1) a virtual memory (VM) system 60, which supports anonymous pages devoted to process stacks and heaps, and (2) a Unified Buffer Cache (UBC) 62, which caches file pages. The UBC contains pages from both mapped files and files accessed through normal read/write calls and is dynamically sized; this approach is similar in some ways to the Sprite file system. A GMS module 68, which holds global pages housed on the node, is added at the same level as VM and UBC. Page replacement decisions are made by a pageout daemon 64 and GMS module 68. A custom translation lookaside buffer (TLB) handle 70 provides information about the ages of VM and UBC pages for use by the GMS.

The kernel is modified to insert calls to the GMS at each point where pages were either added to or removed from the UBC. Similarly, calls are inserted into the VM swapping code to keep track of additions and deletions to the list of anonymous pages. Inserting these calls into the UBC and VM modules allows the preferred embodiment to track the collection of pages on the node. It also allows it to forward disk reads to the GMS. Disk writes to a disk/network file system (NFS) 74 occur exactly as in the original OSF/1 system. A free list 66 is a list of available (unused) memory pages on the node that are accessible by the VM system, UBC, and GMS. A remote GMS module 72 shows that this node is linked to other nodes that are part of the cluster on which the GMS is implemented.

4.1 Basic Data Structures

The algorithm manages pages in the cluster, which are ultimately backed by secondary storage: either a local disk or an NFS server's disk. Each page of data must be uniquely identified, so that the physical location of that page (or the multiple locations for a shared page) can be tracked. A page is uniquely identified in terms of the file blocks that back it. In OSF/1, pages are a fixed multiple of disk blocks; entire pages, rather than blocks, are transferred between the disk driver and the rest of the kernel. Thus, to identify the contents of a page, it is sufficient to know the IP address of the node backing that page, the disk partition on that node, the node number, and the offset within the node where the page resides. A 128 bit cluster-wide unique identifier (UID) is used to record this information. The embodiment ensures that the page identified by each UID is in one of four states: (1) cached locally on a single node, (2) cached locally on multiple nodes, (3) cached on a single node on behalf of another node, or (4) not cached at all.

Three principal data structures are maintained, keyed by the UID:

1. The page-frame-directory (PFD) is a per-node structure that contains a record for each page (local or global) that is present on the node. A successful UID lookup in the PFD yields information about the physical page frame containing the data, LRU statistics about the frame, and whether the page is local or global. An unsuccessful lookup implies that the particular page is not present on this node.

2. The global-cache-directory (GCD) is a cluster-wide data structure that is used to locate the IP address of a node that has a particular page cached. For performance reasons, the GCD is organized as a hash table, with each node storing only a portion of the table.

3. The page-ownership-directory (POD) maps the UID for a shared page to the node storing the GCD section containing that page. For non-shared pages, the GCD entry is always stored on the node that is using the page. The POD is replicated on all nodes and is changed only when computers are added or deleted from the cluster.

Figure 4:
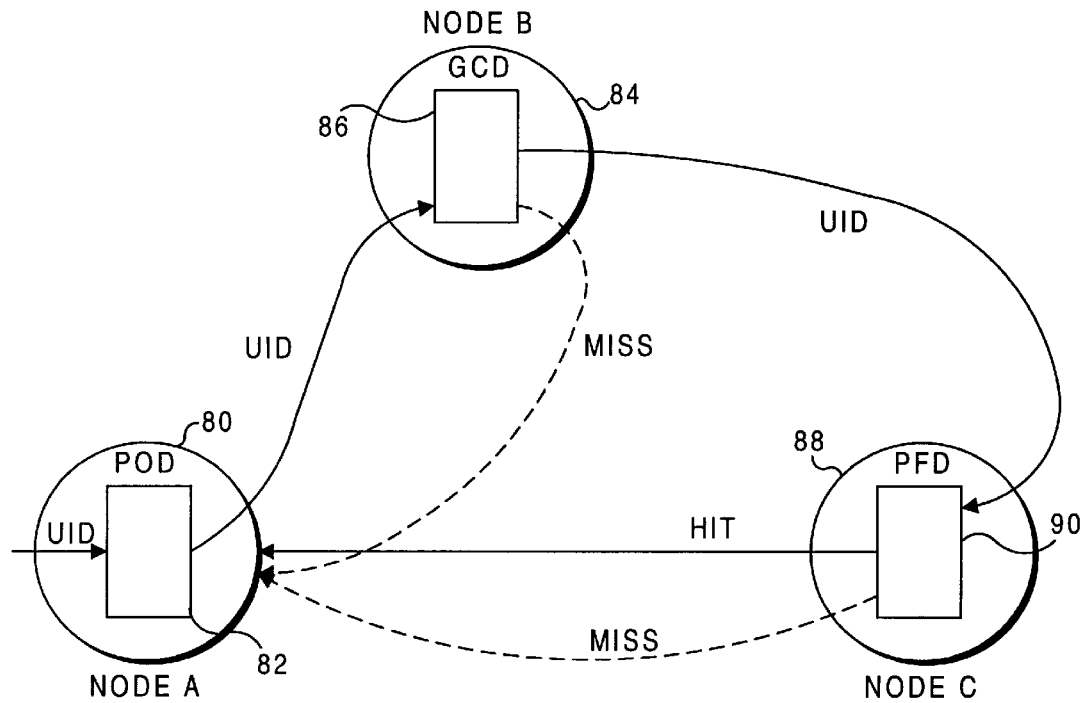
FIG. 4 is a schematic diagram illustrating how a page is located on a node.

Finding a page following a fault requires a two-step lookup, as shown in FIG. 4. First, the requesting node (e.g., node A, workstation 80 in FIG. 4) uses the UID to hash into a POD 82, producing an IP address of the node (node B, workstation 84) implementing the appropriate region of the global-cache-directory. The requester sends a message containing the UID to the GMS on that node, requesting the page identified by the UID. The GMS on the node does a lookup in the global-cache-directory, which results in either a miss or a hit. In case of a miss, a message is sent to the original node. In case of a hit, a GCD 86 on node B forwards the request to the node that contains a PFD 90 for the UID (node C, workstation 88), which replies to the requesting node. FIG. 4 shows three nodes involved in the lookup. When a faulted page is not shared, nodes A and B are identical, thereby decreasing the number of network messages needed. This distribution of the page management information is somewhat similar to the handling of distributed locks in VAX clusters.

The page-ownership-directory provides an extra level of indirection that enables the process to handle the addition or deletion of nodes from the cluster without changing the hash function. A central server running on one of the workstations is responsible for updating the indirection table and propagating it to the rest of the duster. This updating must occur whenever there is a reconfiguration. Parts of the global-cache-directory database are redistributed on reconfiguration as well. However, none of these operations are critical to the correct operation of the cluster. In the worst case, during the redistribution process, some requests may fail to find pages in global memory and will be forced to access them on disk.

4.2 Collecting Local Age Information

An important part of the algorithm is its page aging process, which provides information for global decision making. Unfortunately, it is difficult to track the ages of some pages in OSF/1. For pages belonging to files accessed via explicit read/write requests, these calls can provide the required age information. However, access to anonymous and mapped file pages is invisible to the operating system. Furthermore, the OSF/1 FIFO-with-second-chance replacement algorithm provides little useful global age information for this purpose, particularly on a system that is not heavily faulting-exactly the case in which it is useful to know the ages of pages.

In order to collect age information about anonymous and mapped pages, the TLB handler, which is implemented in PAL code on the DEC Alpha workstation, was modified. Once a minute, the TLB is flushed of all entries. Subsequently when the TLB handler performs a virtual-to-physical translation on a TLB miss, it sets a bit for that physical frame. A kernel thread samples the per-frame bit every period in order to maintain LRU statistics for all physical page frames. It should also be noted that an alternative approach for determining age information has been implemented in which the operating system page replacement procedure is modified to collect the page age information. For mapped pages, age is approximated by deactivating some pages so that an access to the page causes a "light-weight" trap to be activated by the operating system. A page's deactivation time establishes its age; active pages are infinitely young. The active-to-inactive page ratio is adjusted over time to minimize both the reactivation rate and the amount of time an idle page remains active.

4.3 Inter-node Communication

Between nodes, a simple non-blocking communication is used. In this preferred embodiment, it is assumed that the network is reliable and so it is possible to marshal and unmarshal to and from IP datagrams directly. This approach is justified primarily by the increased reliability of modem local area networks such as AN2 that have flow control to eliminate cell loss due to congestion. To date, a dropped packet has not been noted in any of the experiments performed. However, the invention can be readily changed to use any other message passing package or transport protocol.

4.4 Addition and Deletion of Nodes

When a node is added to the cluster, it checks in with a designated master node, which then notifies all the existing members of the new addition. The master node distributes new copies of the page-ownership-directory to each node, including the newly added one. Each node distributes the appropriate portions of the global-cache-directory to the new node. In the current preferred embodiment, the master node is predetermined and represents a single point of failure that can prevent addition of new nodes. It is straightforward to extend this implementation to deal with master node failure through an election process to select a new master, as is done in other systems.

Node deletions are straightforward as well. The master node checks periodically for the liveness of the other nodes. When it detects a crashed node, it redistributes the page-ownership-directory. As with addition, global-cache-directories are also redistributed at that time.

4.5 Basic Operation of the Algorithm

Section 3 described the basic operation of the algorithm in terms of a series of page swaps between nodes (see Cases 1 through 4). However, in the actual implementation of this preferred embodiment, the swaps are performed in a somewhat different fashion, as follows.

On a fault, the faulting node allocates a frame from its free-frame list and executes a remote getpage operation for the missing page. The inter-node interaction for a getpage operation is conceptually identical to the scenario shown in FIG. 4. Specifically, on a hit, the actual data are resumed; on a miss, the requesting node goes to disk (or to the NFS server). The global-cache-directory is updated with the new location of the page and the page-frame-directory structures on the requester and the remote node are updated suitably. If the remote node was caching the page on behalf of another node, i.e., it was a global page, then the remote node deletes its entry from the page-frame-directory. (Recall from Section 3 that there needs to be only one copy of a global page in the system, because the cost of remotely accessing a global page is independent of the node on which it is located.) The only other possibility is that the requested page is a local shared page, in which case the remote node marks it as a duplicate. In either case, the requesting node adds an entry.

The getpage operation represents one half of the swap; the second half is executed at a later time in the context of the pageout daemon. As getpage operations are executed on a node, the free list shrinks, eventually causing the pageout daemon to wakeup. The pageout daemon, in concert with the GMS, the UBC, and the VM managers (see FIG. 3), attempts to evict the oldest pages on the node. These evictions are handled by the GMS module, which has age information about all these pages. Some of the pages are pushed to other idle nodes (using a putpage operation); others are discarded because they are older than the MinAge value for the current epoch. Those putpage operations that go to other nodes may eventually cause older pages on those nodes to be forwarded or discarded.

When a node performs a putpage operation, apart from sending the page to the target node, it also updates the global-cache-directory at the node that is responsible for the affected page. The target node and the sending node each update their page-frame-directory structures. If the evicted page is a shared global page for which a duplicate exists elsewhere in the cluster, then it is simply discarded.

Figure 5:
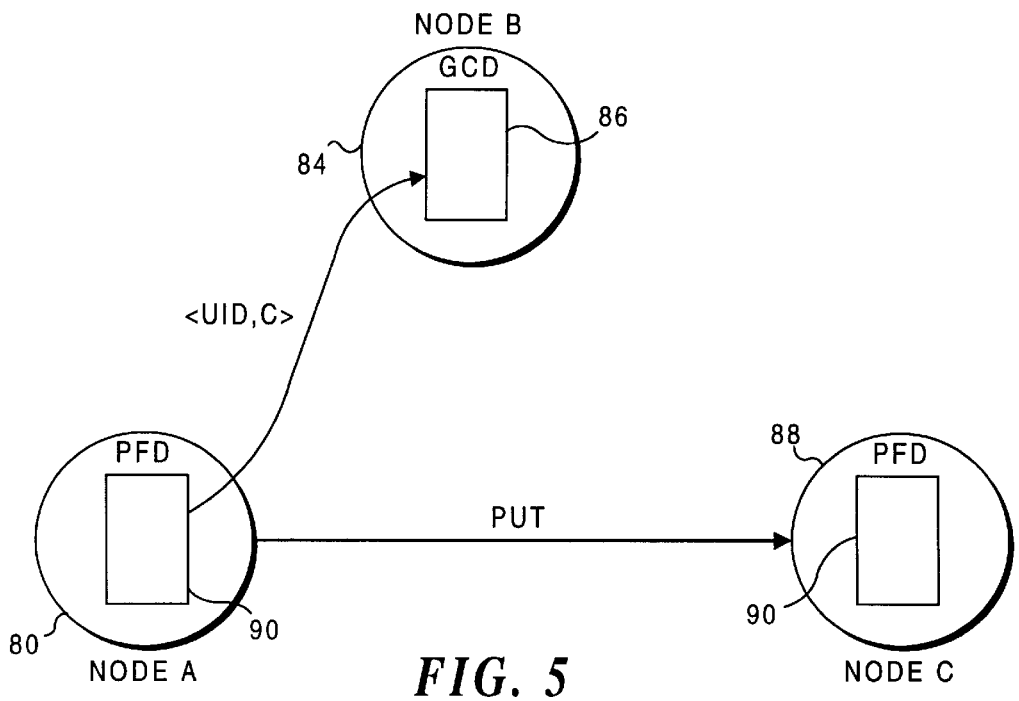
FIG. 5 is a schematic diagram illustrating a Putpage operation.

The target node for a putpage operation is selected by executing the algorithm described in Section 3.2. FIG. 5 depicts the major steps involved in a putpage operation.

4.6 Computer Suitable for Implementing the Present Invention

Figure 14:
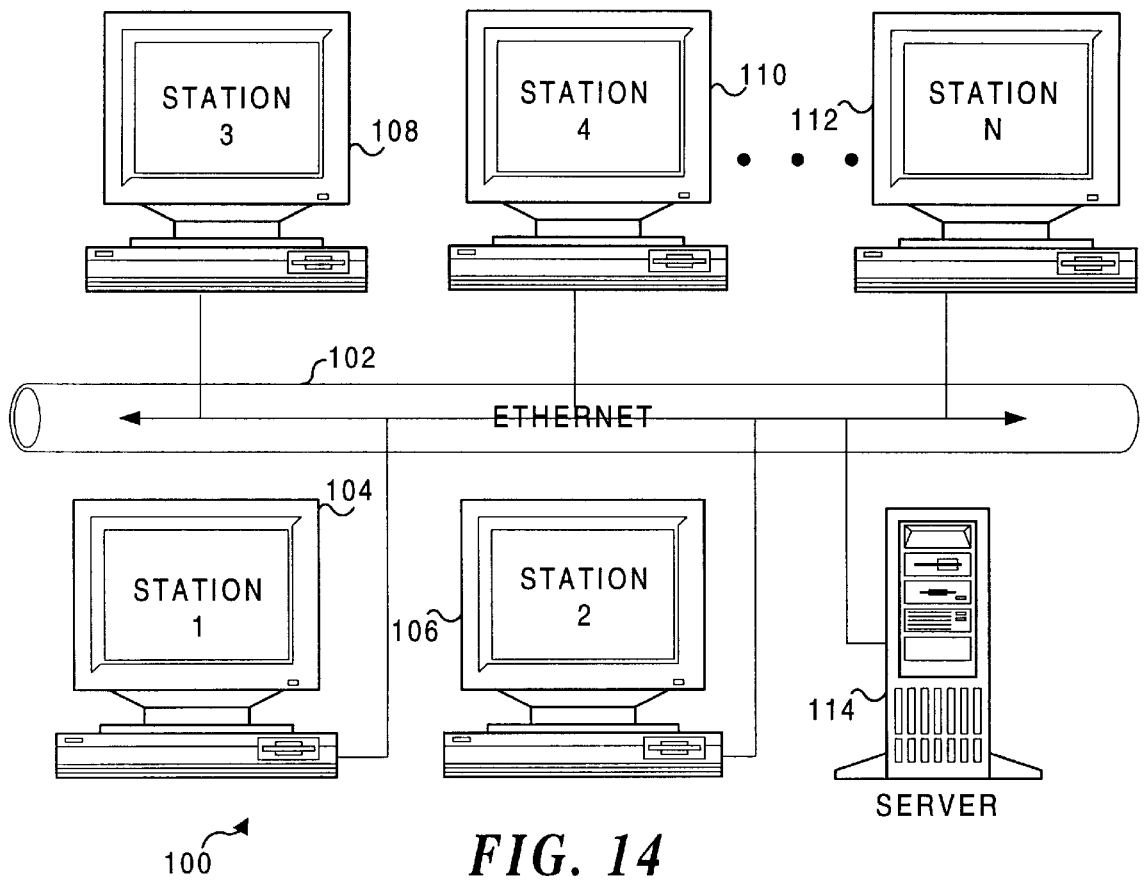
FIG. 14 is a diagram showing a portion of a local area network suitable for use in implementing the present invention.

As noted herein, a preferred embodiment of the present invention has been evaluated on a network DEC 3000-700 workstations. An example of a network of N such workstation 104, 106, 108, 110, and 112, coupled via an Ethernet data communication system 102 in communication with each other and with a server 114, is shown in FIG. 14. However, it is contemplated that other types of computers coupled in a cluster on a LAN can employ the present invention for more efficiently managing idle memory in the cluster. Such computers can include hand-held devices, portable or laptop computers, conventional personal computers, multiprocessor computers, mainframe computers, and any other type of processor-based computing device that includes or uses memory for implementing computational tasks.

Figure 15:
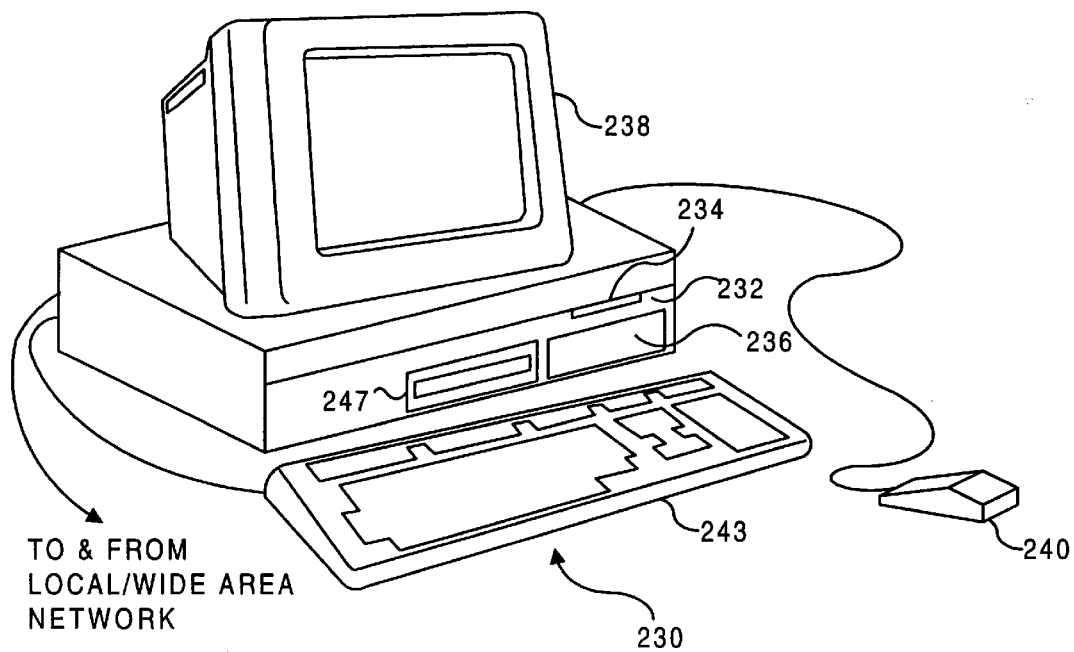
FIG. 15 is an isometric view of a typical workstation computer for use on a network in practicing the present invention.

With reference to FIG. 15, a generally exemplary workstation 230 is illustrated, which is suitable for use in practicing the present invention, i.e., workstation 230 comprises a node of a computer system on which the present invention is implemented. The workstation includes a processor chassis 232 in which are mounted a hard drive 236 and, optionally, a floppy disk drive 234. A motherboard within the processor chassis is populated with appropriate integrated circuits (not shown) and a power supply (also not shown). A monitor 238 is included for displaying graphics and text generated by software programs executed by the workstation. A mouse 240 (or other pointing device) is connected to a serial port (or to a bus port) on the rear of processor chassis 232, and signals from mouse 240 are conveyed to the motherboard to control a cursor and to select text, menu options, and graphic components displayed on monitor 238 in response to software programs executing on the workstation, including the software program implementing the present invention. In addition, a keyboard 243 is coupled to the motherboard for entry of text and commands that affect the running of software programs executing on the workstation.

Workstation 230 also optionally includes a compact disk-read only memory (CD-ROM) drive 247 into which a CD-ROM disk may be inserted so that executable files and data on the disk can be read for transfer into the memory and/or into storage on hard drive 236 of workstation 230. Workstation 230 is coupled to a LAN and wide area network (WAN) and is one of a plurality of such workstations on the network. In many cases, files accessed by these workstations will be stored on a server (not shown) accessed over the network.

Figure 16:
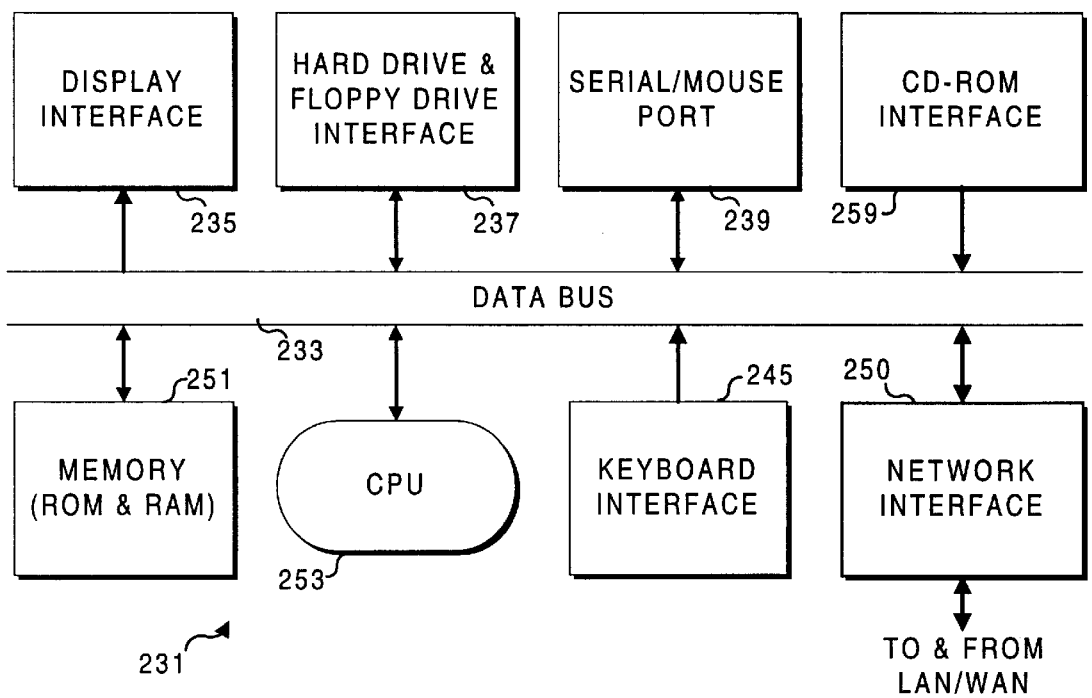
FIG. 16 is a block diagram illustrating functional components of the workstation computer of FIG. 15.

Although details relating to all of the components mounted on the motherboard or otherwise installed inside processor chassis 232 are not illustrated, FIG. 16 illustrates some of the functional components that are included. The motherboard includes a data bus 233 to which these functional components are electrically connected. A display interface 235 generates signals in response to instructions executed by a central processing unit (CPU) 253 that are transmitted to monitor 238 so that graphics and text are displayed on the monitor. A hard drive/floppy drive interface 237 is coupled to data bus 233 to enable bidirectional flow of data and instructions between data bus 233 and floppy drive 234 and/or hard drive 236. Software programs executed by CPU 253 are typically stored on either hard drive 236, or on a floppy disk (not shown) that is inserted into floppy drive 234. The present invention will likely be distributed as either a stand-alone application that is used in connection with an operating system or as part of an operating system, such as OSF/1. The computer language instructions that cause the CPU to implement the present invention will thus likely be distributed on a memory media, such as floppy disks, on a CD-ROM disk, or on other optical or magnetically readable media. Alternatively, the software may be distributed over the Internet.

A serial/mouse port 239 is also bidirectionally coupled to data bus 233, enabling signals developed by mouse 240 to be conveyed through the data bus to CPU 253. A CD-ROM interface 259 connects CD-ROM drive 247 to data bus 233. The CD-ROM interface may be a small computer systems interface (SCSI) type interface or other interface appropriate for connection to and operation of CD-ROM drive 247. Although a CD-ROM drive is indicated, it is also contemplated that other types of optical storage devices such as a DVD and an appropriate interface might also be used.

A keyboard interface 245 receives signals from keyboard 243, coupling the signals to data bus 233 for transmission to CPU 253. Coupled to data bus 233 is a network interface 250 (which may comprise, for example, an Ethernet™ card for coupling the workstation to a local area and/or wide area network). Thus, software used in connection with the present invention may optionally be stored on a remote server and transferred to workstation 230 over the network to implement the present invention.

When a software program is executed by CPU 253, the computer instructions comprising the program that are stored on memory media such as a floppy disk, a CD-ROM, a server (such as server 114, shown in FIG. 14), or on hard drive 236 are transferred into a memory 251 via data bus 233. Computer instructions comprising the software program are executed by CPU 253, causing it to implement functions determined by the computer instructions. Memory 251 includes both a non-volatile read only memory (ROM) in which computer instructions used for booting up workstation 230 are stored, and a random access memory (RAM) in which computer instructions and data are temporarily stored when executing programs, such as the software program implementing the present invention.

5. Logical Steps Implemented by Software

In one preferred embodiment of the present invention, the operating system is modified to carry out logical steps related to global management of memory. These steps are illustrated in several flowcharts discussed below. Since the operating system includes components that are executed on each of the workstations included in a network, as well as on the server, no attempt is made in the following discussion to differentiate on which portion of the network the following steps are implemented. However, for the most part, these steps are effected by the workstations or nodes of the network in a cluster on which the GMS is effected.

Figure 17:
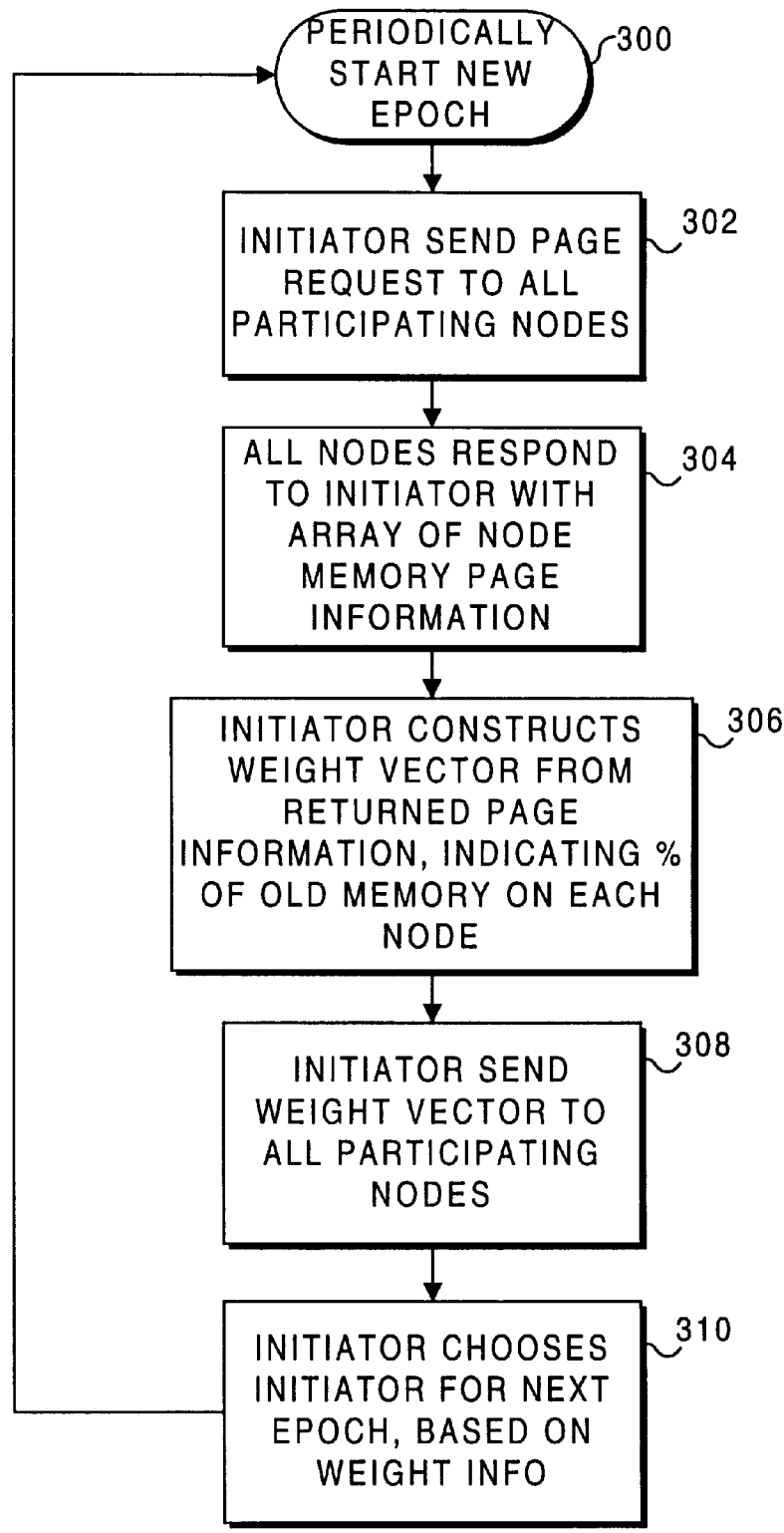
FIG. 17 is a flow chart showing the logical steps implemented by the present invention in collecting global page information.

FIG. 17 illustrates the logical steps required for collecting global page information. As implied by a block 300, a succession of time intervals or epochs are periodically started. As each new interval starts, the steps that follow in the flow chart are implemented. Each workstation receives a signal from the initiator node, indicating that a new time interval or epoch has been started. One of the workstations, which has been designated as a current initiator, sends a page request to all participating nodes, as stated in a block 302 in the flow chart. In response, all of the participating nodes provide the initiator with an array of node memory page information that identifies the pages held in the local and global memory of each node and the length of time that each page has been held in memory. This step is indicated in a block 304.

Next, a block 306 provides that the initiator constructs a weight vector from the page information returned by the other nodes. The weight vector indicates the percent of "old" memory on each of the nodes, i.e., out of the M oldest pages in memory on the network, $w_i$ pages or $w_i/M$ percent are in the memory of node i. In a block 308, the initiator sends the weight vector for each node to all of the participating nodes in the cluster. As indicated in a block 310, based on the weight information, the current initiator then chooses the initiator for the next epoch or time interval. The node with the greatest percentage of old memory is selected as the initiator for the next epoch or time interval, since that node has the most idle pages. The logic then loops back to wait for the start of the next epoch, which will initiate a collection of updated memory page information from the nodes. Epochs occur every five to ten seconds in the preferred embodiment.

Figures 18, 19:
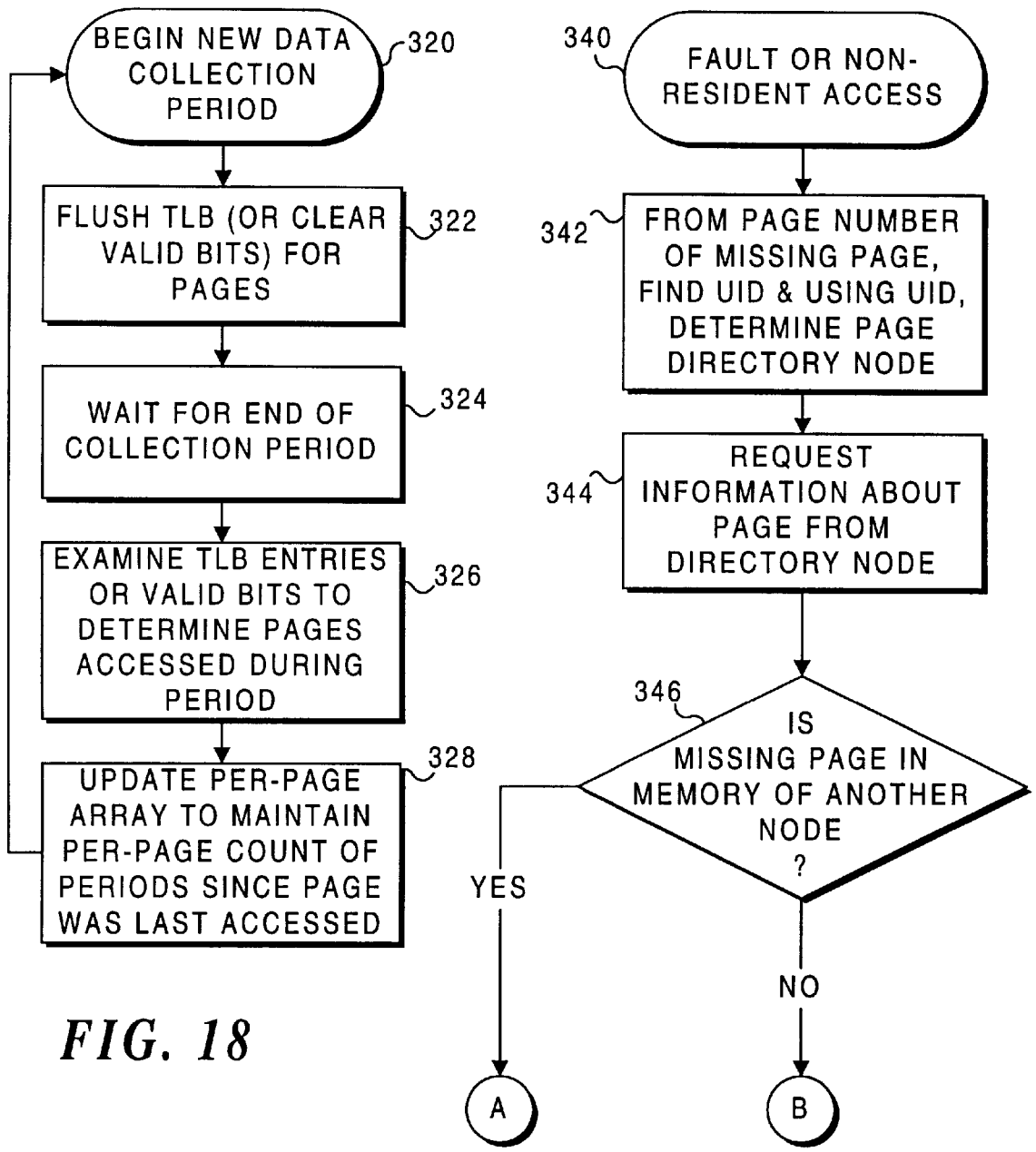
FIG. 18 is a flow chart showing the logical steps implemented by the present invention in collecting local page information.
FIG. 19 is a flow chart showing the logical steps implemented by the present invention in replacing pages on nodes of a network.

The next flow chart is in FIG. 18. As noted in a block 320, the procedure begins when a new data collection period is initiated. In a block 322, the first step of this procedure is to flush the TLB, which corresponds to clearing the valid bits in the data maintained therein for each of the pages. Proceeding to a block 324, the flow chart calls for waiting for the end of the collection period in the current epoch. Next, in a block 326, the TLB entries or valid bits are examined so that the program can track each page that has been accessed by any of the nodes during the current data collection period. Finally, a block 328 updates the per-page array so as to maintain a per-page count of the number of periods that have elapsed since each page was last accessed. The array thus is a record of the age of each page since the page was required by any node. The logic then loops back to block 320 to begin a new collection period.

The steps carried out for replacement of a page in the memory or a node are indicated in FIG. 19. When a fault or non-resident access of a page occurs, as indicated in a block 340, the GMS must obtain the requested page from the location in which it is stored. As indicated in a block 342, the UID of the page is determined using a page number for the requested page (the page that is missing from the local memory of the node requesting the page). Then, using the UID, the page directory node where the missing page is found is determined. In a block 344, based upon the directory node, a request is made for information about the page.

A decision block 346 determines if the missing page is in the memory of another node. If not, the missing page is stored on disk and is not available in any global memory cache. However, assuming that the missing page can be found in the memory of another node, the logic proceeds to a decision block 348 in FIG. 20. This decision block determines if the faulted page is in local memory on the other node. If not within the local memory on the other node, the missing page will be found in global memory, stored for another node that had previously requested it. A negative response to decision block 348 leads to a block 350 in which the missing page is transferred from the global memory of the node on which it was stored into the local page buffer on the node originally requesting it.

A decision block 352 determines if there are any global pages on the node requesting the missing page. If not, a block 354 chooses the oldest local page on that node as a "victim" page. Alternatively, if global pages exist, any global page is selected as the victim, as provided in a block 356. Following either blocks 354 or 356, the logic proceeds to a block 358 in which the victim page is sent to the node on which the missing page was found. A block 360 provides that the victim page replaces the missing page that was requested in the memory of the node that was holding the missing page. The page replacement procedure then terminates.

Referring back to decision block 348, if the faulted or missing page is stored in the global memory of the node holding it, a block 362 provides for copying the local page (i.e., the missing page) into the local page memory or buffer on the node requesting the missing page. A decision block 364 determines if the node requesting the page has any global pages. If not, a block 366 provides for choosing the oldest local page as a victim page. Conversely, if the node requesting the page has a global page, any global page is selected as a victim, as provided in a block 368. Following either blocks 366 or 368, the logic proceeds to a block 370. In this block, a node is chosen at random, with a probability proportional to the weight assigned to the page weight vector for that node. The victim page is then sent to the chosen node, as indicated in a block 372.

Blocks 374 through 378 are referred to as defining a "chosen node algorithm." In block 374, the chosen node receives the page that was evicted from the node requesting the missing page. A block 376 provides that the chosen node stores the received page in its memory buffer as a global page. Finally, a block 378 indicates that the chosen node chooses its oldest page as a victim for replacement. The victim chosen in block 378 is simply removed from the global page memory of the chosen node (but is still available on disk). The procedure then terminates.

Figure 20:
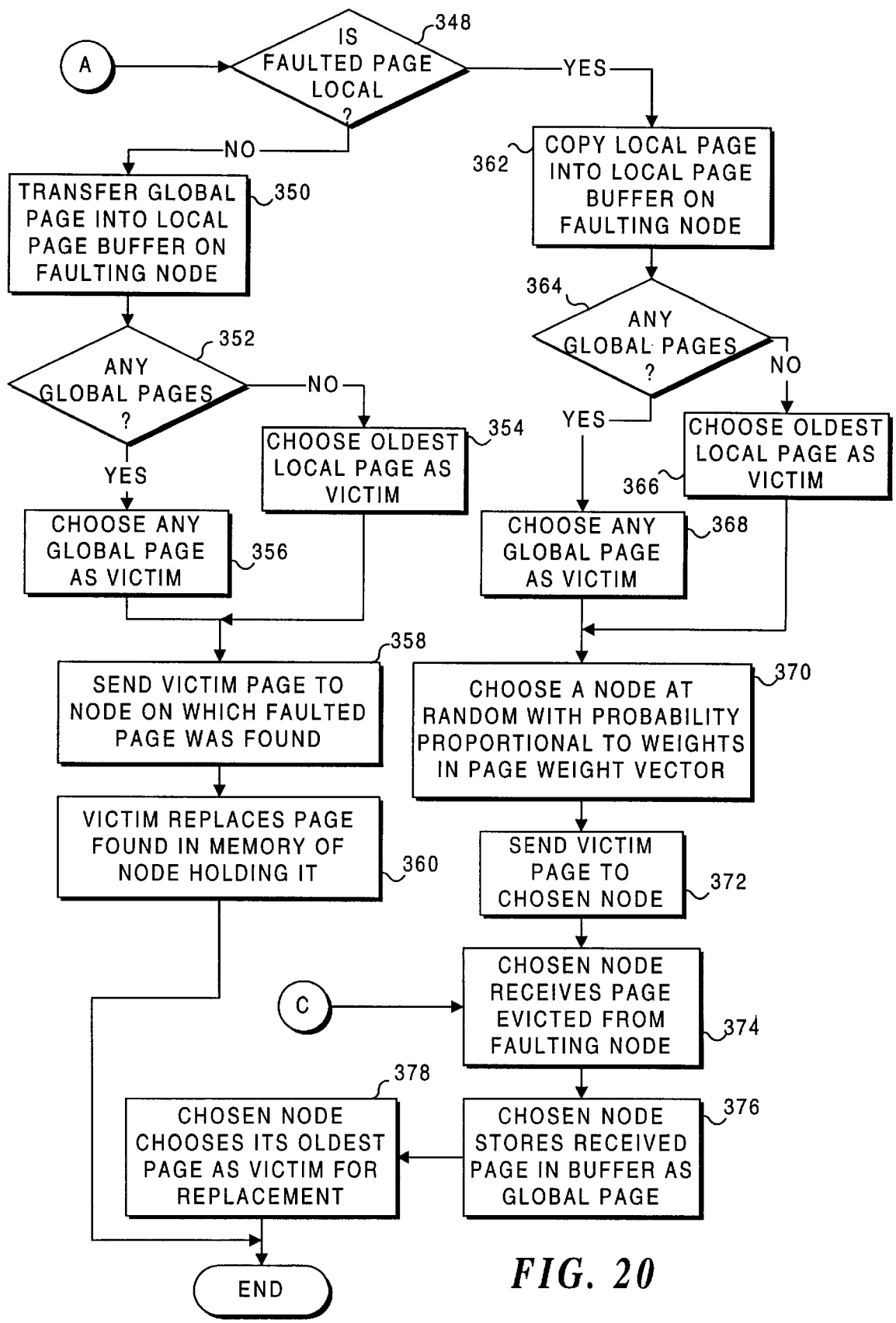
FIG. 20 is a flow chart illustrating the steps for replacing a page in the memory of another node.
Figure 21:
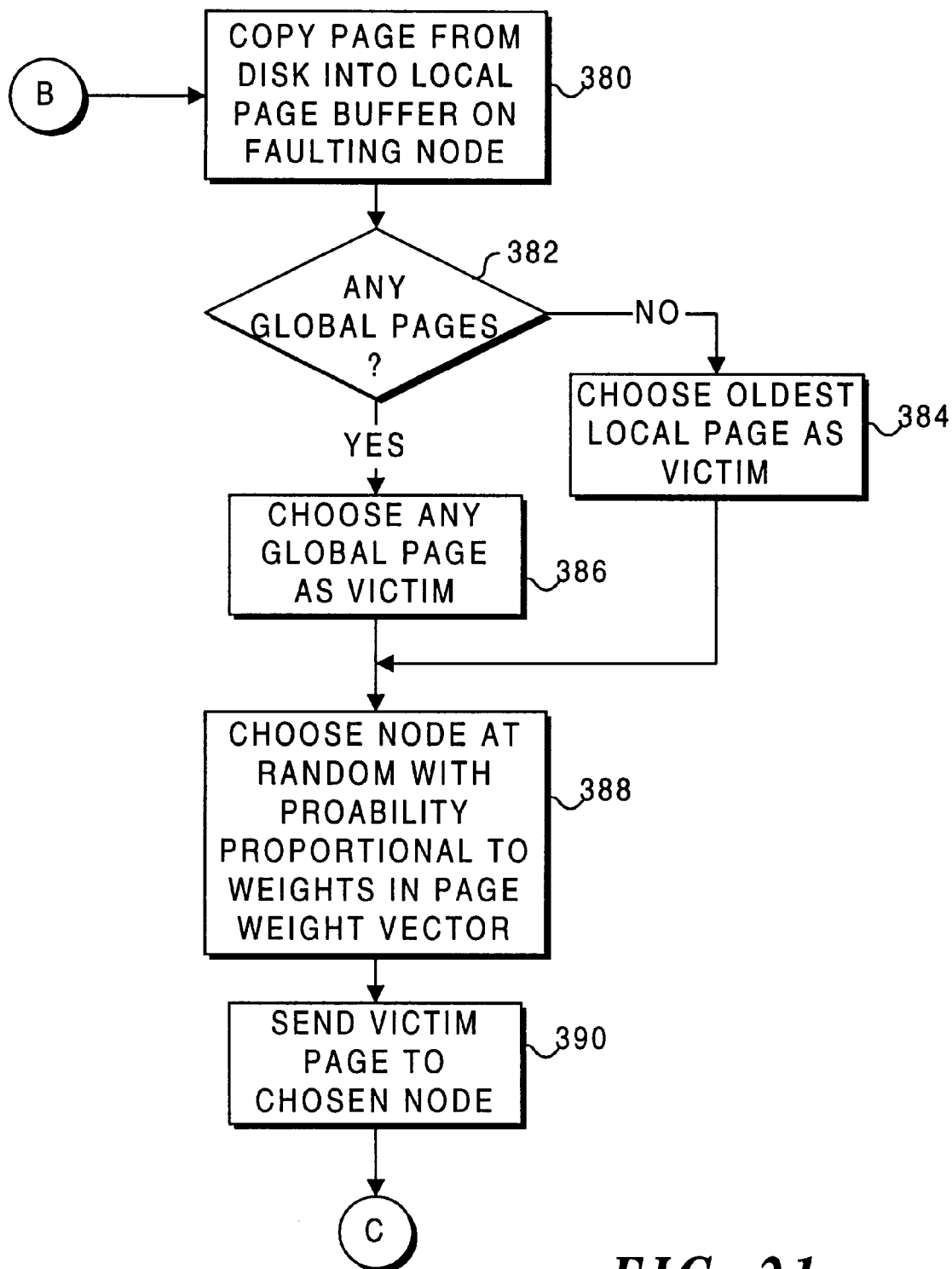
FIG. 21 is a flow chart illustrating the logical steps for replacing a page, where a faulted page is stored on a disk or other non-volatile memory medium.

Referring back to block 346 in FIG. 19, in the event that the missing page is not available in the memory of another node, but is instead stored on disk, the logic proceeds to a block 380 in FIG. 21. In block 380, the missing page is copied from disk into the local page buffer of the faulting node, i.e., the node requesting the missing page. A decision block 382 determines if there are any global pages in the memory of that node and if not, the oldest local page is selected as a victim page in a block 384. Conversely, if there are global pages, the oldest global page is selected as the victim page in a block 386. Following blocks 384 or 386, a block 388 provides for choosing the node at random, with a probability proportional to the weight assigned in the page vector for that node. In a block 390, the victim page chosen in either blocks 384 or 386 is sent to the chosen node. The logic then proceeds with the chosen node algorithm (starting at block 374), as shown in FIG. 20.

6. Performance

This section provides performance measurements of the preferred implementation of global memory management from several perspectives. First, micro-benchmarks are presented that give a detailed breakdown of the time for fundamental global memory management operations. Second, the speedup obtained by memory intensive applications when using the present invention is evaluated. Third, the effectiveness of the algorithm under different global loading parameters is determined. All experiments were carried out using DEC Alpha workstations running OSF/1 V3.2, connected by a 155 Mb/s DEC AN2 ATE network. The page size on the Alpha and the unit of transfer for these measurements is 8 Kbytes.

6.1 Microbenchmarks

Simple measurements have been made to evaluate the underlying performance of this preferred embodiment of the invention. The experiments were done using eight 225-MHz DEC 3000-700 workstations in the environment above, each with a local disk and connection to one or more NFS file servers that export shared files, including program binaries. All of these measurements were taken on otherwise idle computers.

TABLE 1

| | Latency in $\mu s$ | | | |
| --- | --- | --- | --- | --- |
| | Non-Shared Page | | Shared Page | |
| Operation | Miss | Hit | Miss | Hit |
| Request Generation | 7 | 61 | 65 | 65 |
| Reply Receipt | — | 156 | 5 | 150 |
| GCD Processing | 8 | 8 | 59 | 61 |
| Network HW & SW | — | 1135 | 211 | 1241 |
| Target Processing | — | 80 | — | 81 |
| Total | 15 | 1440 | 340 | 1558 |

Table 1 itemizes the cost of a getpage operation. The getpage cost depends on whether the page is shared or non-shared and whether there is a hit or miss in the global cache. As described in Section 4.1, if the page is non-shared, the GCD (global-cache-directory) node is the same as the requesting node.

The rows provide the following information. Request Generation is the time for the requesting node to generate a getpage request, including access to the page-ownership-directory to contact the GCD node. Reply Receipt is the requester time spent to process the reply from the remote node; e.g., for a hit, this includes the cost of copying data from the network buffer into a free page and freeing the network buffer. GCD Processing accounts for the total time spent in the GCD lookup operation as well as forwarding the request to the PFD node. Network HW&SW is the total time spent in the network hardware and the operating system's network protocol. The bulk of this time is spent in hardware; when sending large packets, the total latency introduced by the sending and receiving controllers is comparable to the transmission time on an optical fiber. Target Processing refers to the time on the remote node to do a lookup in the page-frame-directory and reply to the requesting node. Total is the sum of the rows and represents the latency seen by the initiating node before the getpage operation completes. (The getpage hit latency could be reduced by about 200 $\mu s$ by eliminating a copy and short circuiting the network-packet delivery path, but these changes have not yet been implemented.) To put these numbers in perspective, on identical hardware, the cost of a simple user-to-user UDP packet exchange for requesting and receiving an 8 Kbyte page is about 1640 μs.

The Total line for the first column shows the cost of an unsuccessful attempt to locate a non-shared page in the cluster. In this case, the requested page is not in the global cache and a disk access is required. This cost thus represents the overhead added to an OSF/1 disk access. The OSF/1 disk access time varies between 3600 μs and 14300 μs, so this period represents an overhead of only 0.4–0.1% on a miss.

TABLE 2

|  | Latency in μs | |
| --- | --- | --- |
| Operation | Non-Shared Page | Shared Page |
| Request Generation | 58 | 102 |
| GCD Processing | 7 | 12 |
| Network HW & SW | 989 | 989 |
| Target Processing | 178 | 181 |
| Sender Latency | 65 | 102 |

Table 2 shows the costs for a putpage operation. As shown in FIG. 5, a putpage updates the global-cache-directory as well as the page-frame-directory structures on the source and target nodes. In the case of shared pages, the sending node might need to initiate two network transmissions-one to the GCD and another to the PFD; this time is reflected in Request Generation. In a putpage operation, the sending node does not wait for reply from the target before returning from a putpage call; therefore, in the bottom row, Sender Latency is shown rather than the total. For shared pages, this latency is the same as Request Generation, for non-shared pages, the latency also includes the CCD processing, because the GCD is on the same node.

Putpage requests are typically executed by a node under memory pressure to free frames. An important metric is therefore the latency for a frame to be freed; this interval consists of the sum of the Sender Latency and the time for the network controller to transmit a buffer, so that the operating system can add it to the free list. For 8 Kbyte pages, the combined transmission and operating system overhead is about 300 μs.

TABLE 3

|  | Access Latency in ms | |
| --- | --- | --- |
| Access Type | GMS | No GMS |
| Sequential Access | 2.1 | 3.6 |
| Random Access | 2.1 | 14.3 |

Table 3 compares the average data-read time for non-shared pages with and without GMS. For this experiment, a synthetic program was run on a computer with 64 Mbytes of memory. The program repeatedly accesses a large number of anonymous (i.e., non-shared) pages, in excess of the total physical memory. In steady state for this experiment, every access requires a putpage to free a page and a getpage to fetch the faulted page. The average read time thus reflects the overhead of both operations.

The first row of Table 3 shows the average performance of sequential reads to non-shared pages. The numbers shown with no GMS reflect the average disk access time; the difference between the sequential and random access times indicates the substantial benefit OSF gains from prefetching and clustering disk blocks for sequential reads. Nevertheless, using GMS reduces the average sequential read time by 41% for non-shared pages. For nonsequential accesses, GMS shows a nearly seven-fold performance improvement. Here, the native OSF/1 system is unable to exploit clustering to amortize the cost of disk seeks and rotational delays.

TABLE 4

|  | Access Latency in ms | | | |
| --- | --- | --- | --- | --- |
| Access Type | GMS Single | GMS Duplicate | NFS Miss | NFS Hit |
| Sequential Access | 2.1 | 1.7 | 4.8 | 1.9 |
| Random Access | 2.1 | 1.7 | 16.7 | 1.9 |

Table 4 shows the data-access times for NFS files that can be potentially shared. In this experiment, a client computer with 64 Mbytes of memory tries to access a large NFS file that will not fit into its main memory, although there is sufficient memory in the cluster to hold all of its pages. There are four cases to consider.

In the first case, shown in the first column of Table 4, it is assumed that all NFS pages accessed by the client will be put into global memory. This condition happens in practice when a single NFS client accesses the file from a server. For the most part, the behavior of the system is similar to the experiment described above, i.e., there will be a putpage and a getpage for each access. In this case, the pages will be fetched from global memory on idle computers.

The second case is a variation of the first, where two clients are accessing the same NFS file. One client has ample memory to store the entire file while the other client does not. Because of the memory pressure, the second client will do a series of putpage and getpage operations. The putpage operations in this case are for shared pages, for which copies already exist in the file buffer cache of the other client (i.e., they are duplicates). Such a putpage operation causes the page to be dropped; there is no network transmission. The average access cost in this case is therefore the cost of a getpage.

The next two cases examine the cost of a read access when there is no GMS. In the first case, the NFS file server is constrained so that it does not have enough buffer cache for the entire file. A client read access will thus result in an NFS request to the server, which will require a disk access. In the final case, the NFS server has enough memory so that it can satisfy client requests without accessing the disk. Here, the cost of an access is simply the overhead of the NFS call and reply between the client and the server. Notice that an NFS server-cache hit is 0.2 ms faster than a GMS hit for a single, reflecting the additional cost of the putpage operation performed by GMS when a page is discarded from the client cache. In NFS, discarded pages are dropped as they are in GMS for duplicates, in which case GMS is 0.2 ms faster than NFS.

6.2 Bookkeeping Overheads

This section describes the cost of performing the essential GMS bookkeeping operations, which include the periodic flushing of TLB entries as well as the overhead of collecting and propagating global page age information.

On the 225 MHz processor, the modified TLB handler introduces a latency of about 60 cycles (an additional 18 cycles over the standard handler) on the TLB fill path. In addition, since TLB entries are flushed every minute, with a 44-entry TLB, a negligible overhead of 2640 (60×44) cycles per minute is introduced. In practice, no slowdown in the execution time of programs with the modified TLB handler has been observed.

Collecting and propagating the age information consists of multiple steps: (1) the initiator triggers a new epoch by sending out a request to each node asking for summary age information, (2) each node gathers the summary information and returns it to the initiator, and (3) the initiator receives the information, calculates weights and epoch parameters, and distributes the data back to each node.

TABLE 5

| Operation | CPU Cost $\mu s$ | Network Traffic bytes/s |
| --- | --- | --- |
| Initiator Request | 78 × n | 25 × n |
| Gather Summary | 3512 | 154 × n |
| Distribute Weights | 45 × n | (108 + 2 × n) × n |

The three rows of Table 5 represent the CPU cost and the network traffic induced by each of these operations. For steps one and three, the table shows the CPU overhead on the initiator node and the network traffic it generates as a function of the number of nodes, n. The CPU cost in step two is a function of the number of pages each node must scan: 0.29 $\mu s$ per local page and 0.54 $\mu s$ for each global page scanned. The overhead shown in the table assumes that each node has 64 Mbytes (8192 pages) of local memory and that 2000 global pages are scanned. Network traffic is indicated as a rate in bytes per second by assuming a worst case triggering interval of two seconds (a two-second epoch would be extremely short). Given this short epoch length and a 100-node network, CPU overhead is less than 0.8% on the initiator node and less than 0.2% on other nodes, while the impact on network bandwidth is minimal.

6.3 Execution Time Improvement

This section examines the performance gains seen by several applications with the global memory system. These applications are memory and file I/O intensive, so under normal circumstances, performance suffers due to disk accesses if the computer has insufficient memory for application needs. In these situations, global memory management is expected to improve performance, assuming that enough idle memory exists in the network. Measurements were made for the following applications:

Boeing CAD is a simulation of a CAD application used in the design of Boeing aircraft, based on a set of page-level access traces gathered at Boeing. During a four-hour period, eight engineers performed various operations accessing a shared 500 Mbyte database. This activity was simulated by replaying one of these traces.

VLSI Router is a VLSI routing program developed at DEC WRL for microprocessor layout. The program is memory intensive and can cause significant paging activity on small memory computers.

Compile and Link is a partial compile and link of the OSF/1 kernel. By far, the most time is spent in file I/O for compiler and linker access to temporary, source, and object files.

007 is an object oriented database benchmark that builds a parts assembly database in virtual memory and then performs several traversals of this database. The benchmark is designed to synthesize the characteristics of MCAD design data and has been used to evaluate the performance of commercial and research object databases.

Render is a graphics rendering program that displays a computer generated scene from a precomputed 178 Mbyte database. In this experiment, the elapsed time was measured for a sequence of operations that move the viewpoint progressively closer to the scene without changing the viewpoint angle.

Web Query Server is a server that handles queries against the fall text of Digital's internal World Wide Web pages (and some popular external Web pages). Its performance for processing a script containing 150 typical user queries was measured.

Figure 6:
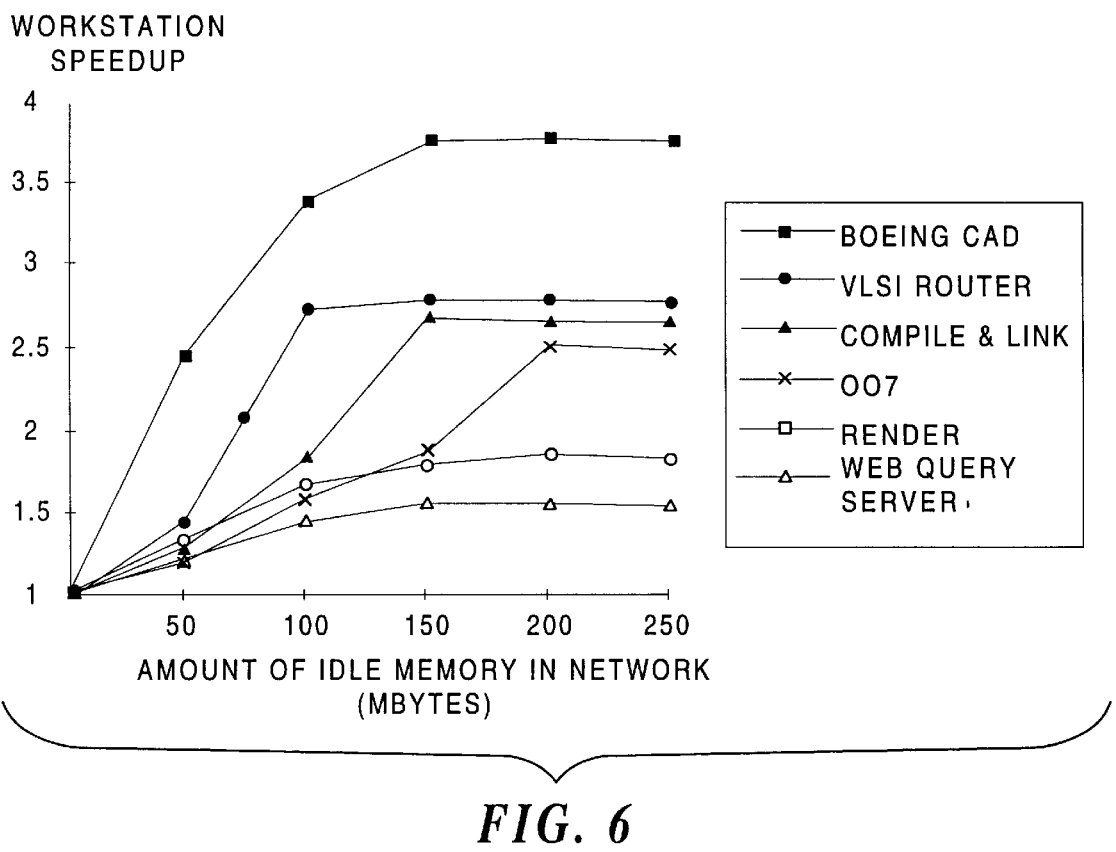
FIG. 6 is a graph showing workload speedup when the present invention is employed.

To provide a best case estimate of the performance impact of global memory management, the speedup of these applications using the present invention was measured relative to a native OSF system that did not employ the present invention. Nine nodes were used for these measurements: eight 225 MHz DEC 3000 Model 700 computers rated at 163 SPECint92 and one 233 MHz DEC AlphaStation 400 4/233 rated at 157 SPECint92. The DEC AlphaStation had 64 Mbytes of memory and ran each application in turn. The other eight computers housed an amount of idle memory that was equally divided among them. The total amount of idle cluster memory was varied to determine the impact of free memory size. FIG. 6 shows the speedup of each of the applications as a function of the amount of idle network memory.

As FIG. 6 illustrates, global memory management has a beneficial impact on all the applications. With zero idle memory, application performance with and without GMS is comparable. This result is in agreement with the micro-benchmarks that indicate GMS overheads are only 0.4–0.1% when there is no idle memory. Even when idle memory is insufficient to meet the application's demands, the present invention provides relatively good performance. Beyond about 200 Mbytes of free memory in the cluster, the performance of these applications does not show any appreciable change, but at that point, speedups of from 1.5 to 3.5 are seen, depending on the application. These speedups are significant and demonstrate the potential of using remote memory to reduce the disk bottleneck.

Figure 7:
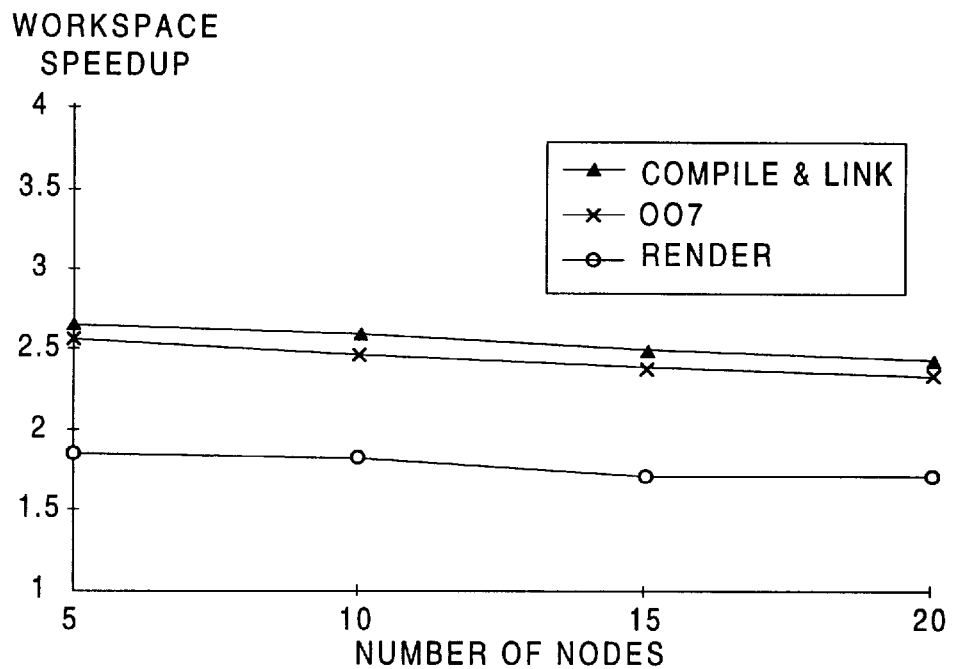
FIG. 7 is a graph illustrating workload speedup as a function of the number of nodes running a workload.

FIG. 6 shows the speedup of each application when running alone with sufficient global memory. Another experiment was run to demonstrate that those benefits remain when multiple applications run simultaneously, competing for memory in a larger network. In this experiment, the number of nodes was varied from five to twenty. In each group of five workstations, two were idle and each of the remaining three ran a different workload (007, Compile and Link, or Render). The idle computers had sufficient memory to meet the needs of the workloads. Thus, when running with twenty nodes, eight were idle and each of the three workloads was running on four different nodes. The results of this experiment, shown in FIG. 7, demonstrate that the speedup remains nearly constant as the number of nodes is increased.

6.4 Responsiveness to Load Changes

The algorithm used in this preferred embodiment of the present invention is based on the distribution and use of memory load information. An obvious question, then, is the extent to which the invention can cope with rapid changes in the distribution of idle pages in the network. To measure this, a controlled experiment was run, again using nine nodes. In this case, the 233 MHz AlphaStation ran a memory intensive application (007 was chosen for this and several other tests because its relatively short running time made the evaluation more practical); the other eight nodes were divided into two sets, including those with idle memory and those without idle memory. The total idle memory in the network was fixed at 150% of what is needed by 007 for optimal performance, and four of the eight nodes had most of the idle memory. For the experiment, every X seconds, an idle node was caused to switch with a non-idle node.

Figure 8:
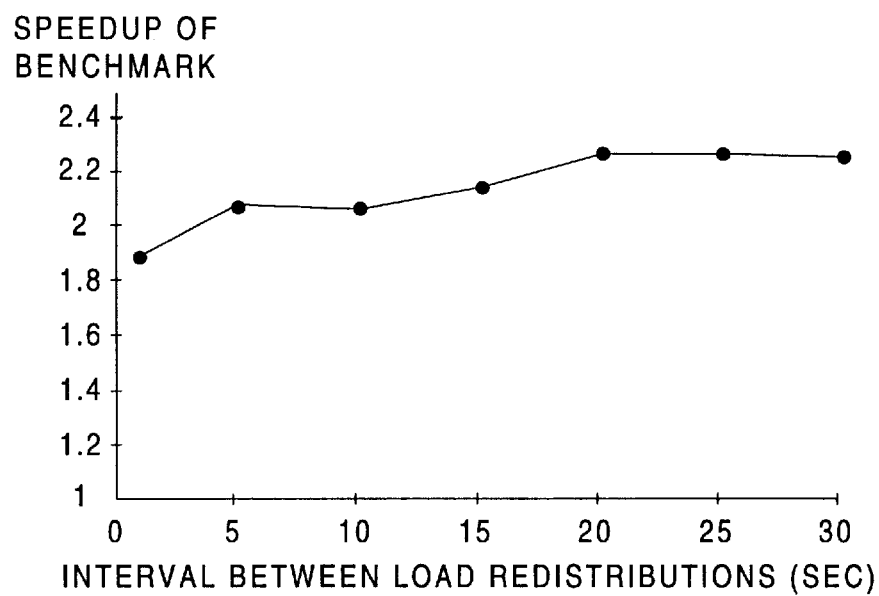
FIG. 8 is a graph showing the effect on the speed benchmark of varying the frequency with which nodes change from idle to non-idle.

FIG. 8 shows the speedup of the 007 benchmark with GMS (again, relative to a non-GMS system) as a function of the frequency with which the load changes occurred. As the graph indicates, the system with GMS is successful at achieving speedup even in the face of frequent and rapid changes. At a maximum change rate of one second, a speedup of 1.9 was still observed over the non-global memory system, despite the fact that the change requires a swap of 70 Megabytes of data between the non-idle and idle nodes, which adds significant stress to the system. At lower change rates of 20 to 30 seconds, only a small (4%) impact on the speedup was observed.

6.5 The Effect of Idle Memory Distribution

Another key question about the algorithm is the extent to which it is affected by the distribution of idle pages in the network. To measure this impact, an experiment was constructed to vary the number of nodes in which idle pages are distributed. Again, the speedup of the 007 benchmark on a system using GMS was measured on one node, while the distribution of idle pages was controlled on eight other nodes. Three points in the spectrum were chosen, and in each case, X% of the nodes contained (100–X)% of the idle memory. The cases considered are: (1) 25% of the nodes had 75% of the free memory, (2) 37.5% of the nodes housed 62.5% of the free memory, and (3) 50% of the nodes held 50% of the free memory. Case (1) is the most skewed, in that most of the free memory is housed on a small number of nodes, while in case (3) the idle memory is uniformly distributed.

For comparison, the results are shown for the algorithm used in the present invention for managing memory, and for N-chance forwarding, the best algorithm defined in the prior art. It is interesting to compare with N-chance, because it differs from the algorithm used in this preferred embodiment of the present invention in significant ways, as described in Section 2. It appears that there is no existing implementation of the N-chance algorithm. Consequently, N-chance was implemented in OSF/1. A few minor modifications were made to the original N-chance algorithm as follows.

Singlet pages are forwarded by nodes with an initial recirculation count of N=2. When a singlet arrives at a node, the victim page to be evicted is picked in the following order. If there are sufficient pages on the free list such that allocating one will not trigger page reclamation (by the pageout daemon), a free page is allocated for the forwarded page and no page is evicted. Otherwise, a choice is made in turn of: the oldest duplicate page in the UBC, the oldest recirculating page, or a very old singlet. If this process locates a victim, it is discarded and replaced with the forwarded page. If no victim is available, the recirculation count of the forwarded page is decremented and it is either forwarded or, if the recirculation count has reached zero, dropped.

These modifications improve the original algorithm, while preserving its key features: (1) a random choice of a target node is made without using global knowledge, and (2) singlets are kept in the cluster at the expense of duplicates, even if they might be needed in the near future.

Figure 9:
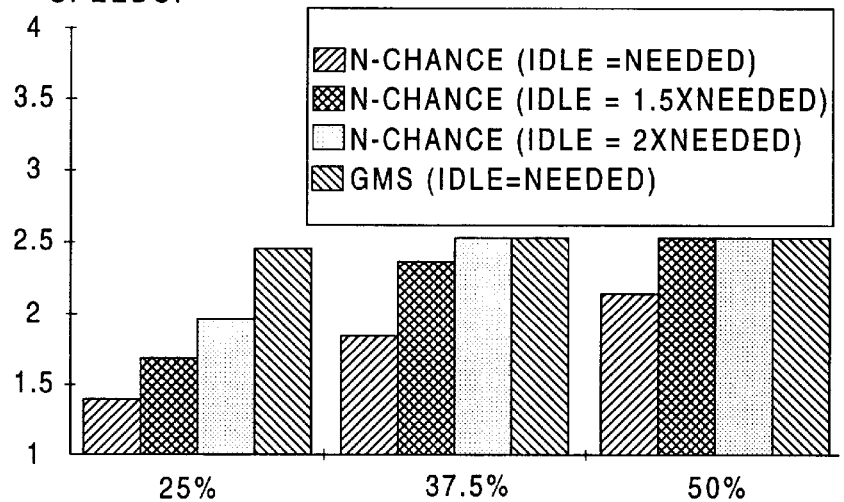
FIG. 9 is a bar graph showing the effect on the benchmark of varying distribution of idleness.

FIG. 9 shows the effect of varying idleness in the cluster. Here, for each point of the idleness distribution graph of four bars, three are shown for N-chance, and one for GMS. The captions corresponding to the N-chance bars indicate, for each case, the total amount of idle memory that was distributed in the network. For example, for Idle=Needed, the network contained exactly the number of idle pages needed by the application, while for Idle=2x Needed, the network contained twice the idle pages needed by the application. The GMS bar is measured with Idle=Needed. From the Figure, it will be noted that for degrees of idleness that are more skewed, it is difficult for N-chance to find the least loaded nodes. For example, in the case of 25% of the nodes holding 75% of the pages, GMS achieves a substantial speedup relative to N-chance in all cases, even if the N-chance algorithm is given twice the idle memory in the network. At 37.5%, where three of the eight nodes hold 63% of the idle pages, N-chance is equivalent to GMS only when given twice the idle memory. Obviously, when there is plenty of free memory in the cluster, the exact distribution of idle pages becomes secondary, and the performance of N-chance is comparable to that of the algorithm used for GMS, as long as N-chance has more pages than are needed.

The effectiveness of the GMS system and its load information is in fact shown by two things: first, it is superior to N-chance with non-uniform idleness distributions, even given fewer idle pages; second, and perhaps more important, the performance of GMS, as shown by the graph in FIG. 9, is more or less independent of the skew. In other words, GMS is successful at finding and using the idle pages in the network, even though it had no excess idle pages on which to rely.

The differences between these algorithms are mostly due to the random nature of the N-chance algorithm. Since N-chance chooses a target node at random, it works best if idle memory is uniformly distributed, which will not always be the case.

6.6 Interference with Non-Idle Nodes

A possible negative effect of global memory management, mentioned above, is that the global management may negatively impact applications running on non-idle nodes in the cluster. A heavily paging node can interfere with other non-idle nodes by adding management overhead, by replacing needed pages, or by causing network traffic.

To test this effect, an experiment was run as before, with nine nodes. One node ran the 007 benchmark, generating global memory traffic. On the remaining eight nodes, idle pages were distributed as in the previous section, creating different skews of the idle pages. However, in this case, all the non-idle nodes ran a copy of a synthetic program that loops through various pages of its local memory; half of the pages accessed by this program are shared among the various running instances, while half are private to each instance.

Figure 10:
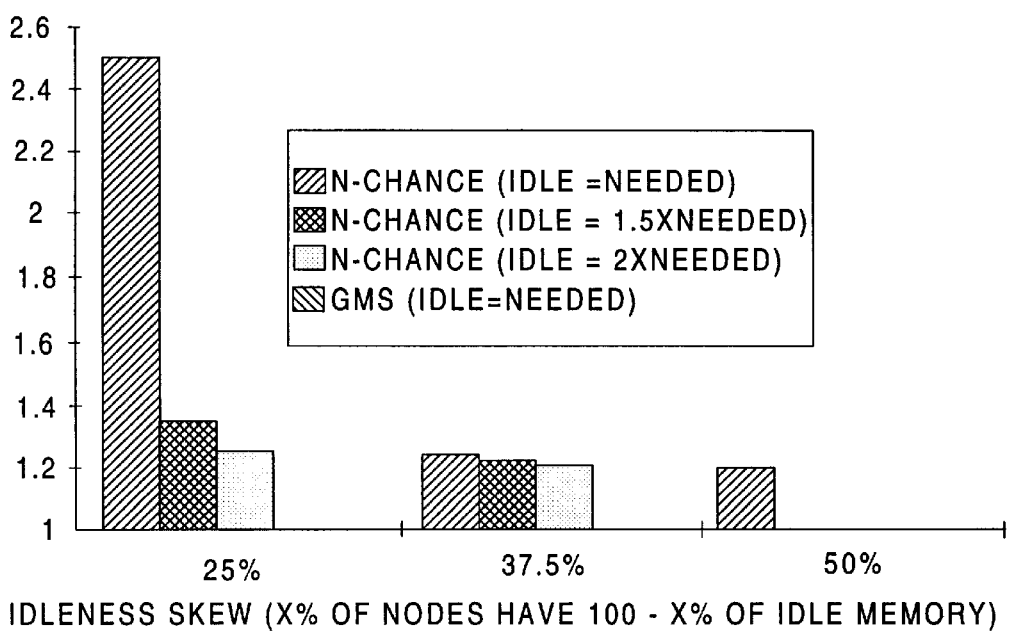
FIG. 10 is a bar graph showing the effect of varying distribution of idleness on the performance of a program actively accessing local memory, half of which is shared data that is duplicated on other nodes.

FIG. 10 shows the average slowdown of the synthetic programs for both GMS and the three N-chance tests, given various distributions of idle memory, as before. The slowdown illustrates the performance decrease relative to the average performance when 007 was not running. For all the distributions tested, GMS causes virtually no slowdown of the synthetic program when 007 is generating global memory traffic. In contrast, N-chance causes a slowdown of as much as 2.5, depending on the amount of idle memory and its distribution. For three idle nodes (37.5%), N-chance causes a slowdown of 1.2, even when twice the needed idle memory is available. When the idle memory is uniformly distributed, N-chance again does as well as GMS, as long as there is additional idle memory in the cluster.

Figure 11:
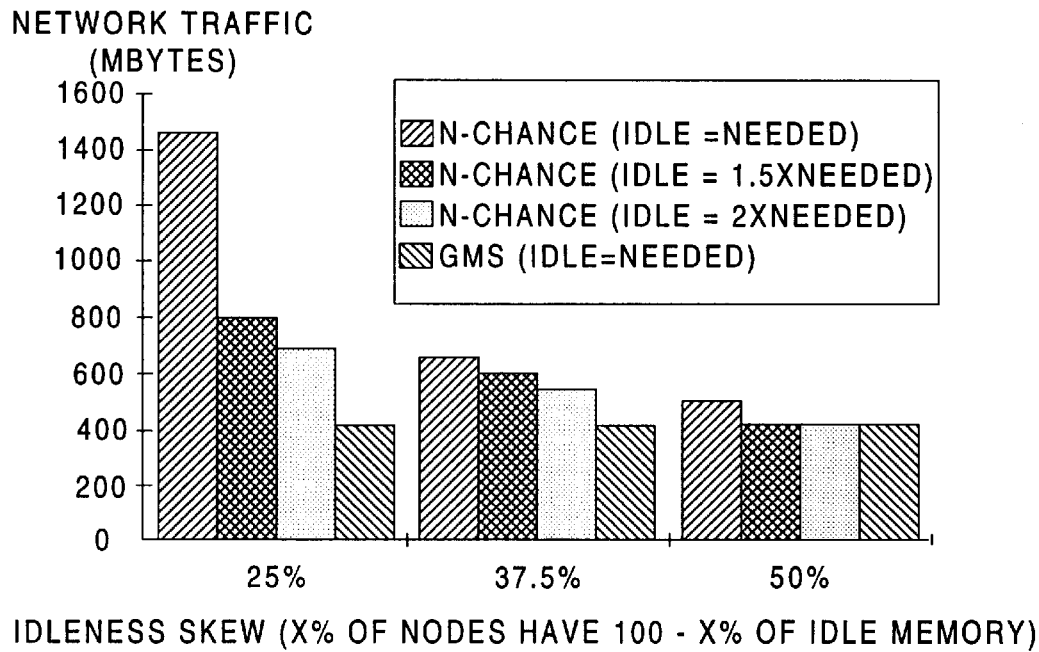
FIG. 11 is a bar graph showing the effect of varying distribution of idleness on network activity.

FIG. 11 shows that for the same experiment, the network traffic in megabytes measured during the test, which took 100–200 seconds. Here the network impact of the two algorithms for the various idle page distributions is evident. For the more skewed distribution of 25%, GMS generates less than $\frac{1}{3}$ of the network traffic of N-chance, given the same number of idle pages in the network. At twice the number of idle pages, N-chance still generates over 50% more traffic than GMS. Not until the idle memory is uniformly distributed does the N-chance network traffic equal the GMS traffic.

The reasons for these differences are two-fold. First, N-chance chooses nodes at random, as previously described, so remote pages from OO7 are sent to the non-idle nodes. Second, N-chance attempts to keep singlets in the network by displacing duplicates, even if they have been recently referenced. This second effect is evident in this test, i.e., the active, shared, local pages on the non-idle nodes are displaced by remote pages sent (randomly) to those nodes by the N-chance algorithm. When the program on the non-idle node references one of these displaced pages, a "fault" occurs, signaling that the page is not in the memory on the computer requesting the page, and the page is retrieved from one of the other nodes or from disk. To make room for the faulted page, the node must discard its LRU page by forwarding it or dropping it if it is a duplicate. This additional paging increases network traffic and reduces the performance of all programs running in the cluster.

6.7 CPU Load on Idle Nodes

The experiment in the previous section demonstrates the success of GMS in avoiding nodes without idle memory. However, even nodes with substantial amounts of idle memory may be "non-idle," i.e., may be running programs executing in a small subset of local memory. A global management system such as the present invention places CPU overhead on such a node in order to use its idle memory, through the getpage and putpage requests to which it must respond.

To evaluate the extent of this impact under heavy load, an experiment was performed in which only one node had idle memory. The CPU load on that node was monitored as the number of clients was increased, using the memory of the node for their global storage. Again, the OO7 was used, increasing the number of OO7 client nodes from one to seven, ensuring in all cases that the idle node had sufficient memory to handle all of their needs.

Figure 12:
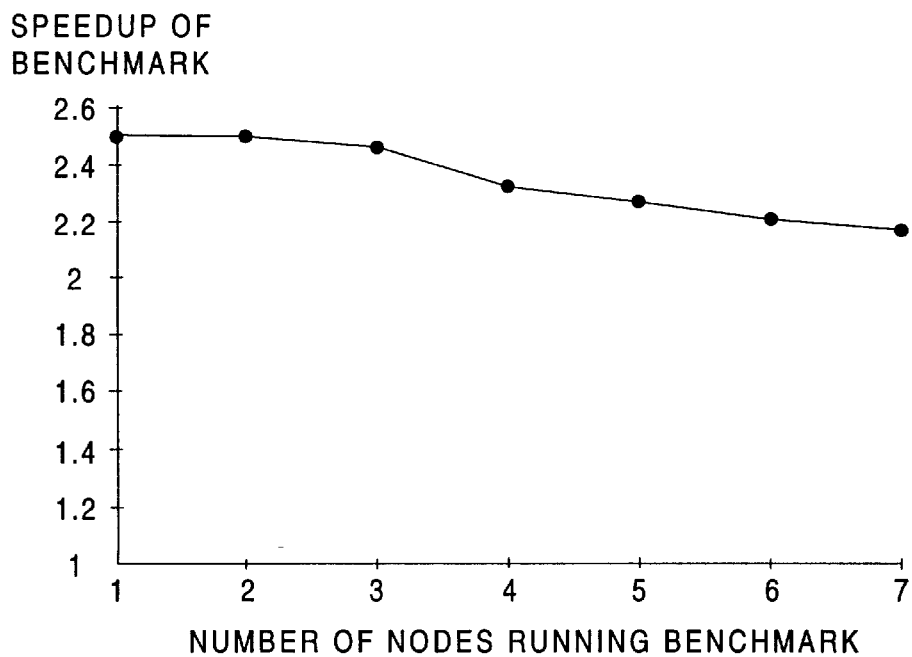
FIG. 12 is a graph illustrating the performance impact of a single idle node serving the remote memory needs for multiple client nodes.

FIG. 12 shows that when seven copies of OO7 were simultaneously using the remote memory of the idle node, the average speedup achieved by GMS was only moderately lowered. That is, the applications using the idle node's memory did not seriously degrade in performance as a result of their sharing a single global memory provider.

Figure 13:
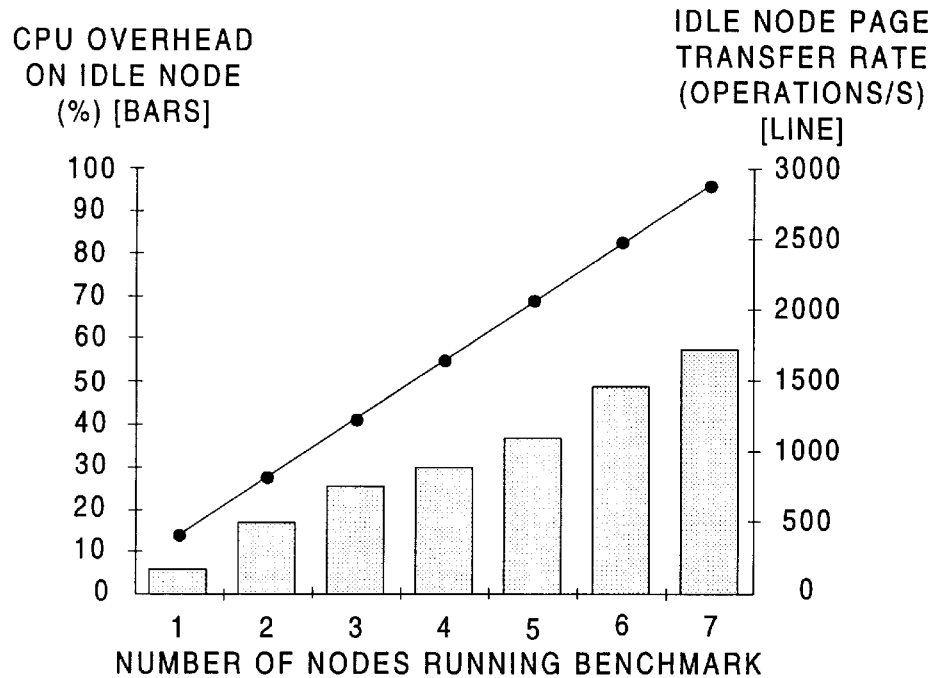
FIG. 13 is a bar graph illustrating the impact of multiple clients on processor performance of an idle node.

On the other hand, FIG. 13 shows the result of that workload on the idle node itself. The bar graph shows the CPU overhead experienced by the idle node as a percentage of total CPU cycles. FIG. 13 also plots the rate of page-transfer (getpage and putpage) operations at the idle node during that execution. From this data, it will be apparent that when seven nodes were running OO7 simultaneously, the idle node received an average of 2880 page-transfer operations per second, which required 56% of the processor's CPU cycles. This translates to an average per operation overhead of 194 $\mu$s, consistent with the previous micro-benchmark measurements.

7. Limitations

The most fundamental concern with respect to network-wide resource management is the impact of failures. In most distributed systems, failures can cause disruption, but they should not cause permanent data loss. Temporary service loss is common on any distributed system, as anyone using a distributed file system is well aware. With the current algorithm employed in this preferred embodiment of the invention, all pages in global memory are clean, and can therefore be retrieved from disk should a node holding global pages fail. The failure of the initiator or master nodes is more difficult to handle; while such schemes have not yet implemented, simple algorithms exist for the remaining nodes to elect a replacement.

A reasonable extension to the GMS system described above would permit dirty pages to be sent to global memory without first writing them to disk. Such a scheme would have performance advantages, particularly given distributed file systems and faster networks, at the risk of data loss in the case of failure. A commonly used solution is to replicate pages in the global memory of multiple nodes.

Another issue is one of trust. As a cluster becomes more closely coupled, the computers act more as a single time-sharing system. The mechanism employed in GMS expects a single, trusted, cluster-wide administrative domain. All of the kernels must trust each other in various ways. In particular, one node must trust another to not reveal or corrupt its data that are stored in the second node's global memory. Without mutual trust, the solution is to encrypt the data while moved to or from global memory. This step could be done most easily at the network hardware level.

The algorithm currently employed in this embodiment of GMS is essentially a modified global LRU replacement scheme. It is well known that in some cases, such as sequential file access, LRU may not be the best choice. The sequential case could be dealt with by limiting its buffer space, as is done currently in the OSF/1 file buffer cache. Other problems could exist as well. For example, a single badly behaving program on one node could cause enormous paging activity, effectively flushing global memory. Of course, even without global memory, a misbehaving program could flood the network or disk, disrupting service. Again, one approach is to provide a threshold limiting the total amount of global memory storage that a single node or single application could consume.

If only a few nodes have idle memory, the CPU load on these nodes could be high if a large number of nodes all attempt to use that idle memory simultaneously. If there are programs running on the idle computers, this CPU loading effect could adversely affect their performance. This effect was measured in the previous section. A possible solution is to incorporate CPU load information with page age information, and to use it to limit CPU overhead on heavily loaded computers.

In the end, all global memory schemes depend on the existence of "a reasonable amount of idle memory" in the network. If the idle memory drops below a certain point, the use of global memory management should be abandoned until idle memory returns to a reasonable level. Measurements show the ability of the algorithm and implementation used in this preferred embodiment to find and effectively utilize global memory, even when idle memory is limited.

8. Conclusions

Current generation LANs, using high speed data communication protocols such as ATM, provide an order of magnitude performance increase over existing ten Megabit/second Ethernet LANs; another order of magnitude improvement-to gigabit networks-is visible on the horizon. Such networks will permit a much tighter coupling of interconnected computers, particularly in local area clusters. To benefit from this new technology, however, operating systems must integrate low latency, high bandwidth networks into their design, in order to increase the performance of both distributed and parallel applications.

It has been shown above that global memory management is one practical and efficient way to share cluster-wide memory resources. The present invention is a memory management system that attempts to make cluster-wide decisions on memory usage, dynamically adjusting the local/global memory balance on each node as the node's behavior and the cluster's behavior change. This invention does not cause data loss should nodes fail, because only clear pages are cached in global memory; cached data can always be fetched from disk if necessary.

The goal of any global memory algorithm is to reduce the average memory access time. Key to the algorithm used in the present preferred embodiment is its use of periodically distributed cluster-wide age information in order to: (1) house global pages in those nodes most likely to have idle memory, (2) avoid burdening nodes that are actively using their memory, (3) ultimately maintain in cluster-wide primary memory the pages most likely to be globally reused, and (4) maintain those pages in the right places. Algorithms that do not have these properties are unlikely to be successful in a dynamic cluster environment.

This algorithm has been implemented on the OSF/1 operating system running on a cluster of DEC Alpha workstations connected by a DEC AN2 ATM network. Measurements show the underlying costs for global memory management operations in light of a real implementation and the potential benefits of global memory management for applications executing within a local area cluster.

Although the present invention has been described in connection with the preferred form of practicing it, those of ordinary skill in the art will understand that many modifications beyond those discussed above can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. On a computer network that includes a non-volatile storage medium for storing data and a plurality of spaced-apart computers disposed at geographically discrete locations coupled together in data communication, each computer comprising a node, a method for allocating temporary storage of the data among the plurality of nodes, each node including a volatile memory in which pages of data including local data for use by the node and global data usable by another of the plurality of nodes are storable in dynamically allocated portions, comprising the steps of:
   (a) determining a value of each page of data temporarily stored in the volatile memory of each of the plurality of nodes;
   (b) each time that a memory fault occurs due to one node attempting to access a page of data that is not temporarily stored in the volatile memory of said one node, transferring the page of data to the volatile memory of said one node, said page of data being stored in one of the non-volatile memory medium and the volatile memory of another node; and
   (c) transferring another page of data from the volatile memory of at least one of the nodes on the network to a different storage location as a function of the value of the other page of data, said different storage location comprising one of the non-volatile memory medium and the volatile memory of a different node.

2. The method of claim 1, wherein when a page of data is transferred from the non-volatile memory medium into the volatile memory of said one of the plurality of nodes, a least valuable page of data stored in the volatile memory of any of the plurality of nodes is removed from said volatile memory.

3. The method of claim 2, wherein if a page of global data and a page of local data are of about the same value, the page of global data is preferably removed from the volatile memory of a node, since substantially more time is required for accessing the page of global data from another node than for accessing the page of local data from the node on which said page of local data is stored.

4. The method of claim 1, wherein more of the volatile memory of any node actively accessing more pages of data is allocated for storing local data compared to the volatile memory of any node that is actively accessing relatively fewer pages of data, so that a portion of the volatile memory allocated to storing global data increases over time compared to that allocated for storing local memory for a node that is not actively accessing pages of data and decreases over time for a node that is.

5. The method of claim 1, further comprising the step of tracking a location for each page of data stored in the volatile memory of any of the plurality of nodes, as pages of data are transferred over the computer network between the plurality of nodes.

6. A method for managing memory on a network in which a plurality of spaced-apart computers disposed at geographically discrete locations are coupled in data communication with each other, at least some of said plurality of computers including a volatile memory for storing data blocks, a cluster of the plurality of computers sharing their volatile memory, said data blocks including both global data and local data, comprising the steps of:
   (a) determining a value for any global data and any local data stored in the volatile memory of each of the plurality of computers;
   (b) if a computer requires desired data that are not stored in a volatile memory of said computer, attempting to access the desired data in the volatile memory of another of the plurality of computers, and if not available in the volatile memory of any other of the plurality of computers, attempting to access the desired data from a non-volatile medium on the network;
   (c) moving the desired data into the volatile memory of the computer requiring the desired data from one of the volatile memory of the other computer and the non-volatile medium,
   (d) moving at least one data block from the volatile memory of the computer requiring the desired data to the volatile memory of a different computer on the network, wherein said at least one data block is selected as a function of the value of the data block;
   (e) repeating steps (b) through (d) for each of the plurality of computers that requires data; and
   (f) implementing step (d) so that the volatile memory of each computer is allocated between storage of the global data and the local data as a function of the value of the data stored therein, the volatile memory of any computer actively requesting desired data tending to fill with local data, and the volatile memory of computers that are not actively using the data tending to fill with global data.

7. The method of claim 6, further comprising the step of determining a weighting for each of the plurality of computers as a function of the value of the data blocks stored therein.

8. The method of claim 7, wherein of a defined number of the least valuable data blocks stored in the volatile memory of all of the computers, the weighting determined for a computer depends upon the number of said least valuable data blocks that are stored in the volatile memory of the computer.

9. The method of claim 8, wherein step (a) and the determination of the weighting are repeated at a start of successive time intervals, said weighting being used to determine a probability function that enables one of the computers to select another of the computers to receive a data block evicted from the volatile memory of said one computer.

10. The method of claim 9, wherein a time interval is terminated by at least one of two events, a first event being an end of a predefined time, and a second event being defined as a function of a number of data blocks received by a computer having a largest weighting.

11. The method of claim 6, further comprising the step of maintaining information about each data block in the volatile memory of each computer, said information including:
    (a) an identification of the computer in which the data block is stored; and
    (b) an address for the data block.

12. The method of claim 11, further comprising the step of updating the information when a data block that includes the desired data is transferred from the volatile memory of one computer to the volatile memory of the computer that requires the desired data.

13. The method of claim 11, further comprising the steps of designating a master computer from among the plurality of computers, indicating to the master computer when any of the plurality of computers joins or leaves the cluster, and updating the information for the data blocks relative to changes caused by a computer joining or leaving the cluster.

14. The method of claim 6, further comprising the step of evicting a data block from the volatile memory of the computer that is requesting desired data, said evicted data block being a least valuable data block in the volatile memory of said computer.

15. The method of claim 14, wherein the value of each data block comprises its age, further comprising the steps of discarding said evicted data block if older than an age limit; and storing the evicted data block in the volatile memory of the different computing device if younger than the age limit.

16. The method of claim 6, further comprising the step of modifying an operating system that is adapted to run on the network to include a capability to implement steps (a) through (f).

17. A computer network system that allocates storage of pages of data among a plurality of spaced-apart computers disposed at geographically discrete locations connected in data communication with each other, each computer comprising a node, said pages of data including local data and global data, comprising:
    (a) a non-volatile storage medium coupled in data communication with the plurality of nodes and adapted for storing the pages of data for access by the plurality of nodes;
    (b) a volatile memory at each of the plurality of nodes, said volatile memory being used for storing a page of data, said page of data comprising either local data for use by the node on which the page of data is stored or global data for use by others of the plurality of nodes;
    (c) a processor in each of said nodes; and
    (d) a software program that executes on the processor in the nodes, for controlling transfer of the pages of data between the volatile memory of the plurality of nodes, and to and from the non-volatile storage medium, and causing a plurality of functions to be implemented, said functions including:
        (i) determining a value of each page of data stored in the volatile memory of each of the plurality of nodes;
        (ii) each time that a memory fault occurs due to one node attempting to access a page of data that is not stored in its volatile memory, transferring the page of data to the volatile memory of said one node from where the page of data is stored, said page of data being stored in one of the non-volatile memory medium and the volatile memory of another node; and
        (iii) transferring another page of data from the volatile memory of at least one of the nodes on the network to a different storage location as a function of the value of the other page of data, said different storage location comprising one of the non-volatile memory medium and the volatile memory of a different node.

18. The computer network system of claim 17, wherein when a page of data is transferred from the non-volatile memory medium into the volatile memory of said one of the plurality of nodes, a least valuable page of data stored in the volatile memory any of the plurality of nodes is removed from said volatile memory.

19. The computer network system of claim 18, wherein if a page of global data and a page of local data are of about the same value, the page of global data is preferably removed from the volatile memory of a node, since substantially more time is required for accessing the page of global data from another node than for accessing the page of local data from the node on which said page of local data is stored.

20. The computer network system of claim 17, wherein proportionally more of the volatile memory of a node accessing more pages of data is allocated for storing local data than on a node accessing fewer pages of data, so that a portion of the volatile memory allocated to storing global data compared to that allocated for storing local memory, increases over time for a node that is not accessing pages of data and decreases over time for a node that is.

21. The computer network system of claim 17, wherein said functions further include tracking a location for each page of data stored in the volatile memory of any of the plurality of nodes, as pages of data are transferred over the computer network between the plurality of nodes.

22. An article of manufacture adapted for use with on a computer network for allocating storage of pages of data among a plurality of nodes connected in data communication with each other, said computer network including a non-volatile storage device, said pages of data including local data and global data, comprising:
    (a) a memory medium for storing machine instructions adapted to be executed by a processor in each of the plurality of nodes; and
    (b) a plurality of machine instructions, which when executed by the processors in the nodes, cause the processors to effect a plurality of functions, said functions including:
        (i) determining a value of each page of data stored in the volatile memory of the node;
        (ii) each time that a memory fault occurs due to one node attempting to access a page of data that is not stored in its volatile memory, transferring the page of data to the volatile memory of said one node from where the page of data is stored, said page of data being stored in one of the non-volatile storage device and the volatile memory of another node; and
        (iii) transferring another page of data from the volatile memory of at least one of the nodes on the network to a different storage location as a function of the value of the other page of data, said different storage location comprising one of the non-volatile storage device and the volatile memory of a different node.

23. The article of manufacture of claim 22, wherein the machine instructions executing on the processors effect removal of a least valuable page of data stored in the volatile memory of any of the plurality of nodes from said volatile memory when a page of data is transferred from the non-volatile storage device into the volatile memory of said one of the plurality of nodes.

24. The article of manufacture of claim 23, wherein the machine instructions cause the processors to preferably remove a page of global data from the volatile memory of a node rather than a page of local data, if the page of global data and the page of local data are of about the same value, since substantially more time is required for accessing the page of global data from another node than for accessing the page of local data from the node on which said page of local data is stored.

25. The article of manufacture of claim 22, wherein the machine instructions cause the processors to allocate relatively more of the volatile memory of any node that is accessing more pages of data for storing local data, compared to a node accessing fewer pages of data, so that a proportion of the volatile memory allocated for storing global data compared to that allocated for storing local data, increases over time for a node that is not accessing pages of data, and decreases over time for a node that is.

26. The article of manufacture of claim 22, wherein the machine instructions cause at least one of the processors to track a location for each page of data stored in the volatile memory of any of the plurality of nodes, as pages of data are transferred over the computer network between the plurality of nodes.

\* \* \* \* \*